United States Patent
Alloin et al.

(10) Patent No.: US 9,166,651 B2
(45) Date of Patent: Oct. 20, 2015

(54) METHOD AND APPARATUS FOR SENSING NOISE SIGNALS IN A WIRELINE COMMUNICATIONS ENVIRONMENT

(71) Applicant: IKANOS COMMUNICATIONS, INC., Fremont, CA (US)

(72) Inventors: Laurent Francis Alloin, Monmouth Beach, NJ (US); William Edward Keasler, Jr., Tinton Falls, NJ (US); Laurent Pierrugues, Fort Lee, NJ (US); Arnold Muralt, Fair Haven, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/056,767

(22) Filed: Oct. 17, 2013

(65) Prior Publication Data

US 2014/0177694 A1    Jun. 26, 2014

Related U.S. Application Data

(60) Provisional application No. 61/715,198, filed on Oct. 17, 2012.

(51) Int. Cl.
*H04B 3/46* (2015.01)
*H04B 3/32* (2006.01)
*H04B 3/487* (2015.01)

(52) U.S. Cl.
CPC .................. *H04B 3/464* (2013.01); *H04B 3/32* (2013.01); *H04B 3/46* (2013.01); *H04B 3/487* (2013.01)

(58) Field of Classification Search
CPC ..................... H04B 25/03878; H04B 25/0256; H04B 3/464; H04B 1/10; H04B 3/32; H04B 3/46; H04B 3/487

USPC ......... 375/219, 220, 222, 227, 229, 232, 316, 375/346, 350
See application file for complete search history.

(56) References Cited

U.S. PATENT DOCUMENTS

| 6,341,159 B1 | 1/2002 | Jollota |
| 2002/0155811 A1 | 10/2002 | Prismantas et al. |

(Continued)

FOREIGN PATENT DOCUMENTS

| EP | 2383899 A1 | 11/2011 |
| WO | WO03-094461 A1 | 11/2003 |

(Continued)

OTHER PUBLICATIONS

International Search Report and Written Opinion issued Feb. 13, 2014 for PCT/US2013/065619.

*Primary Examiner* — Leon Flores
(74) *Attorney, Agent, or Firm* — Pillsbury Winthrop Shaw Pittman LLP

(57) ABSTRACT

The present invention relates to methods and apparatuses for sensing noise sources in a wireline communications environment such as a customer premises environment in a DSL system. In embodiments, the invention includes an additional sensor that is connected to power mains in a DSL customer premises environment either to characterize, at their source, noises coupling into the DSL lines, and/or to mitigate their impact into the DSL lines. One objective is associated with diagnostics that help to better characterize the noise signals themselves and derive correlation of signals sensed from the power mains and their possible projection onto the DSL line. Another objective makes use of these power line sensor signals to mitigate or to eliminate power line noises that make their way onto the DSL line. Example embodiments further include and exploit signals from additional secondary sensors such as secondary common mode, differential mode and phantom mode sensors.

22 Claims, 23 Drawing Sheets

(56) References Cited

U.S. PATENT DOCUMENTS

| | | |
|---|---|---|
| 2005/0169357 A1 | 8/2005 | Sedarat |
| 2006/0039454 A1 | 2/2006 | Cioffi |
| 2009/0034592 A1* | 2/2009 | Mirfakhraei et al. ......... 375/222 |
| 2009/0252234 A1 | 10/2009 | Samdani et al. |
| 2009/0323903 A1 | 12/2009 | Cioffi et al. |
| 2010/0135482 A1 | 6/2010 | Jagannathan et al. |

FOREIGN PATENT DOCUMENTS

| | | |
|---|---|---|
| WO | WO2011-065945 | 6/2011 |
| WO | WO2012-091725 A1 | 7/2012 |

* cited by examiner

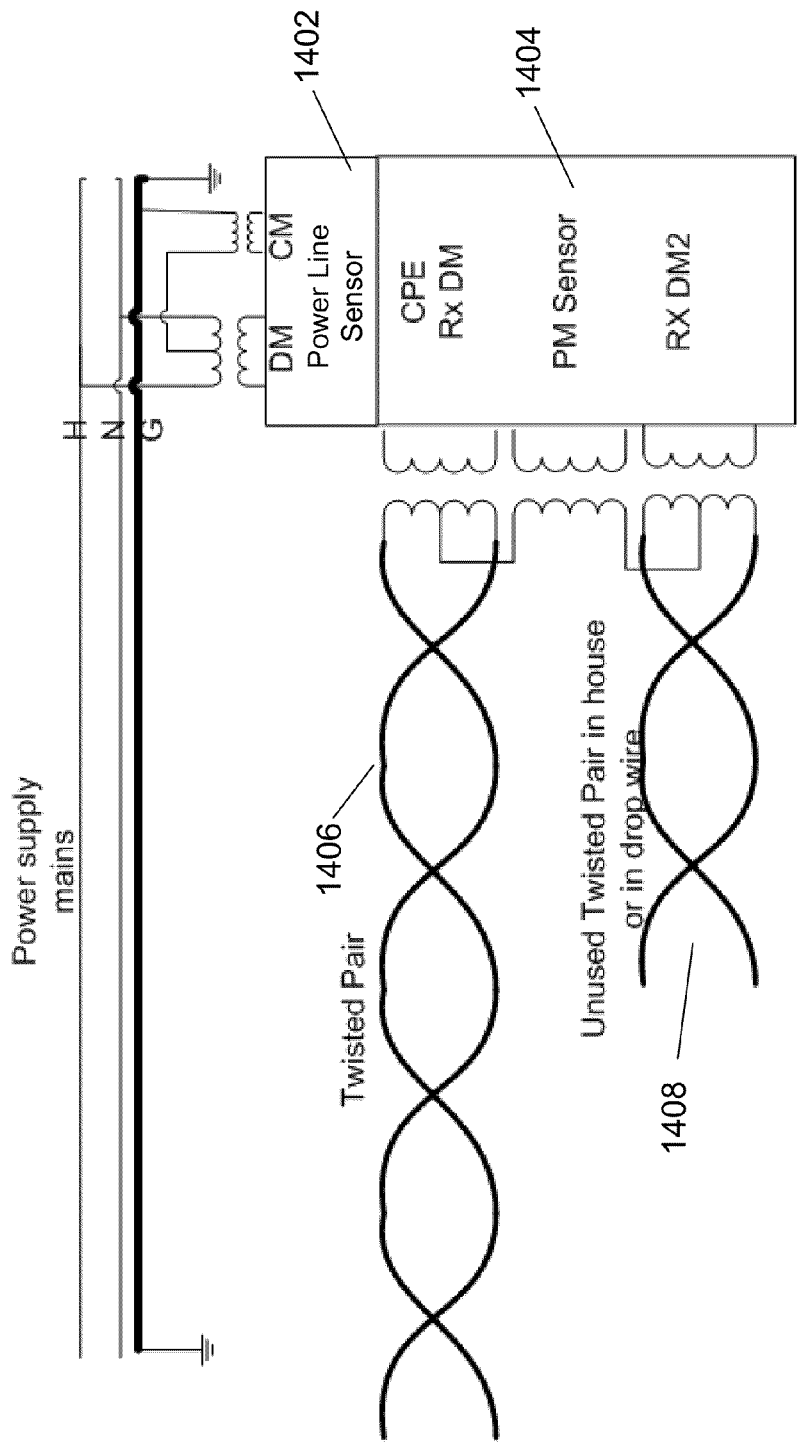

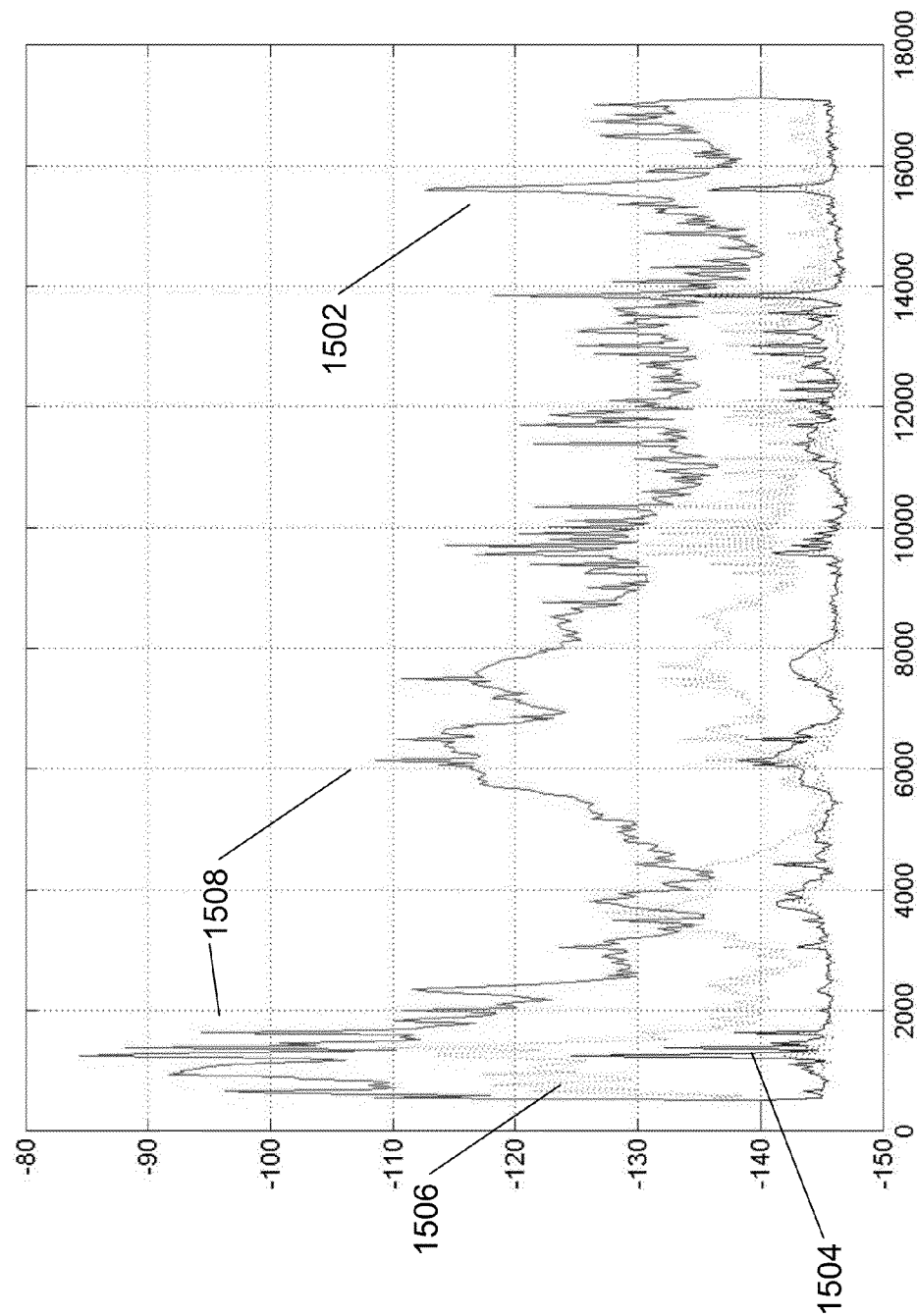

METHOD AND APPARATUS FOR SENSING NOISE SIGNALS IN A WIRELINE COMMUNICATIONS ENVIRONMENT

CROSS REFERENCE TO RELATED APPLICATIONS

This application claims priority under 35 USC 119(e) of prior U.S. Provisional Patent Application No. 61/715,198, filed Oct. 17, 2012, the disclosure of which is hereby incorporated by reference in its entirety.

FIELD OF THE INVENTION

The present invention relates generally to wireline communications, and more particularly to a sensor coupled to power lines for use in characterizing and/or mitigating noise sources in a DSL modem.

BACKGROUND OF THE INVENTION

In a DSL deployment, stationary and impulsive noises are generated within the home environment, which impact the reliability of the WAN interface of a residential device delivering network services such as IPTV. Sources of such disturbances include house appliances such as vacuum cleaners, lamps, or equipment such as pool pumps, washing machines, etc. Apart from Differential Mode (DM) self-FEXT signals that are expected to result primarily from a DM to DM coupling, in a house environment DSL noise sources are assumed to originate predominantly from a capacitive coupling due to the proximity in the house of the twisted pair and the power supply mains on which are generated most of the domestic noise sources.

Some noise sources may be radiating externally directly into the twisted pair, which acts like an antenna to incoming waves. Such is the case for RFI disturbers that develop a common mode (CM) signal onto the drop and which get converted into a DM signal, without being necessarily present on the power mains. But it is expected that most of the domestic noise sources find their way to the DSL line due to capacitive coupling between the mains network and the twisted pair, rather than through radiation.

Relatedly, in traditional electromagnetic compatibility (EMC) compliance testing of DSL modems illustrated in FIGS. 1 and 2, injection of electrical fast transients (EFTs) into the equipment under test (EUT) 102 is performed in order to evaluate the immunity of modems against interferences that are representative of field conditions. Bursts of EFTs are typically caused by operation of electro-mechanical switches, motors and distribution switch-gears connected to the power distribution network. A typical burst consists of a large number of recurring impulses at high frequency for a short time period. Since the EFTs are inherently travelling on the power distribution network within a house, these transients can make their way to the DSL port with which they interfere through at least two possible paths: first through a capacitive or inductive coupling of the power supply lines in the house with the DSL cable itself, with which they come in close proximity; and secondly, through leakage of the EFT signals through the power supply leads to which the DSL modem is connected in order to receive its power. As a result of the multiplicity of possible coupling paths, immunity tests against EFTs are traditionally performed on the Telecom port (TP) and/or on the Power supply port. FIG. 1 illustrates the direct coupling of EFT signals into the DSL line itself by use of a coupling clamp 104. FIG. 2 illustrates the coupling of EFT signals through the power supply port 106 of the DSL modem.

The principle by which the EFT signal impacts the DM DSL signal is illustrated as follows. FIG. 3 illustrates the EFT signal conversion through the loop imbalance following a capacitive coupling of the EFT signal from the in-house mains network 302 and the DSL twisted pair 304. As the EFT signal travels on the power mains in-house network, a voltage $V_{EFT}$ is developing on the hot/neutral pair of the in-house network with respect to a reference ground. At one specific or more coupling points within the house due to the proximity of the in-house power mains network 302 and the DSL twisted pair 304, this $V_{EFT}$ signal couples into the DSL line and projects itself as a CM signal on the Tip and Ring (T&R) pair 308 of the DSL twisted pair, as a voltage $V_{EFT\text{-}CM}$. The CM signal on the twisted pair is then converted to a DM voltage $V_{EFT\text{-}DM}$ due to the imbalance of the twisted pair with respect to ground. This $V_{EFT\text{-}DM}$ signal superimposes itself onto the useful DSL signal and perturbs it. This scenario is captured in the test procedure shown in FIG. 1.

FIG. 4 illustrates the principle by which the EFT signal travelling onto the in-house mains network 404 can leak through the power supply unit 402 of the DSL modem, and converts itself into a DM signal at the T&R of the DSL modem port. As represented, the voltage $V_{EFT}$ is developing on the hot/neutral pair of the in-house network 404 with respect to a reference ground. It is present on the power supply leads 406 that provide power to the DSL modem. Even if the power supply unit provides a high level of isolation for this unwanted signal, a certain voltage $V_{EFT\text{-}CM}$ can make its way through leakage to the DSL front end, which is electrically floating with respect to ground, thereby inducing a CM signal present on the T&R pair 408 of the DSL twisted pair at the modem. This CM signal $V_{EFT\text{-}CM}$ on the twisted pair is then converted to a DM voltage $V_{EFT\text{-}DM}$ due to the imbalance of the twisted pair with respect to ground, as seen at the point of injection. This $V_{EFT\text{-}DM}$ signal superimposes itself onto the useful DSL signal and perturbs it. This scenario is captured in the test procedure of FIG. 2.

In actual field scenarios, however, the injection of the EFT signals takes place simultaneously through capacitive coupling and power supply leakage, since the EFT signals are expected to impact both interfaces of the modem simultaneously. This situation just illustrates the fact that any modem (i.e. DSL link) may be susceptible to environmental interference on any of its physical interfaces (e.g. TP port, Power Supply port, Ethernet port, Serial port, etc.) In this event, whenever two coupling paths exist together between the power mains and the DSL loop, either through the capacitive coupling of the loop (FIG. 3) or through the leakage of the power supply (FIG. 4), the resulting DM noise on the DSL pair is actually a superposition of two separate noises which couple to the CM mode on the twisted pair, and then to DM through different transfer functions. FIGS. 3 and 4 illustrate that the CM to DM conversion of the signals that take place on the loop will be determined by two different mode conversion transfer functions, which will be different in the two cases due to the exact point of injection of the CM signal resulting from the coupling of the power mains noise. At these two points, which will be physically two distinct points on the cable (e.g. one point somewhere far from the modem (FIG. 3) and one point close to the modem (FIG. 4)), the imbalance of the cable that drives the conversion of the CM noise to DM as perceived by the modem is likely to be different.

Accordingly, as illustrated in FIG. 5, there will be in effect two coupling paths of interest: a signal conversion path 502 through capacitive/inductive coupling of the power mains into CM of T&R, which then gets converted to DM at a point of imbalance of the TP; and noise signal conversion 504 from the power mains through the power supply block into T&R, that may get converted from CM to DM locally due to T&R imbalance.

Those two paths of interest superimpose. Provided that the noise source signals, which couple into the two points of imbalance, are identical, the resultant noise will appear to have coupled through a single aggregate conversion path, due to the principle of superposition.

In practice, the coupling path through the power supply unit is under control of the board designer. It should be minimized and reduced to a level that is well below the coupling path that may exist between the power mains network and the DSL line along the in-house network. In this discussion, the manifestation of the noise leakage through the power supply unit serves the purpose of illustrating the point developed hereafter that a connection path exists to the power mains noise through the power supply. The present inventors recognize that if controlled, this connection can be put to use efficiently for noise source characterization and mitigation into the DSL line.

The situation of coupling of noise through the power supply is not limited to EFT noise sources; it was also observed by the present inventors in a controlled lab environment with an HP-AV disturber connected to the same power line as the modem. The leaked HP-AV signal created a measurable CM signal at the T&R, even though the T&R port of the modem was not connected to the cable. Whenever the modem was connected to the cable, the CM signal then got converted into a DM signal on the T&R through the loop imbalance. This situation is an illustration that in practice, noise sources that are effectively present on the power supply mains may find their way into the DSL port through power supply leakage.

In any event, in view of the foregoing, it would be desirable to be able to characterize the CM noise generated by the power mains that couples into the DM DSL signal at its source.

SUMMARY OF THE INVENTION

The present invention relates to methods and apparatuses for sensing noise sources in a wireline communications environment such as a customer premises environment in a DSL system. In embodiments, the invention includes an additional sensor that is connected to power mains in a DSL customer premises environment either to characterize, at their source, noises coupling into the DSL lines, and/or to mitigate their impact into the DSL lines. One objective is associated with diagnostics that help to better characterize the noise signals themselves and derive correlation of signals sensed from the power mains and their possible projection onto the DSL line. Another objective makes use of these power line sensor signals to mitigate or to eliminate power line noises that make their way onto the DSL line. Example embodiments further include and exploit signals from additional secondary sensors such as secondary common mode, differential mode and phantom mode sensors.

In accordance with these and other aspects, an apparatus in a customer premises environment of a wireline communication system according to embodiments of the invention includes a primary sensor coupled to receive data signals of the wireline communication system; and a power line sensor coupled to receive power line signals corresponding to noise source interferences originating from power mains in the customer premises environment.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 14 illustrates an example of concurrent use of a power line sensor(s) with a secondary DM and PM sensors using an unused pair according to embodiments of the invention;

FIGS. 15*a* and 15*b* are graphs illustrating various modes of powerline noise in an example CPE environment;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Among other things, the present inventors recognize that in the event that the home power mains is the main concentration point where the majority of domestic noise sources propagate in a house, before they get coupled through a capacitive or inductive coupling to the twisted pair CM or DM modes, a sensor coupled directly to the home power mains (e.g. through a modem power supply port) would allow the collection of the noise at its source. Such a sensor can be complementary or an alternative to a CM noise sensor applied at the T&R pair, which has been traditionally considered for use to cancel the converted CM noise onto the DM signal.

Figure 15B:
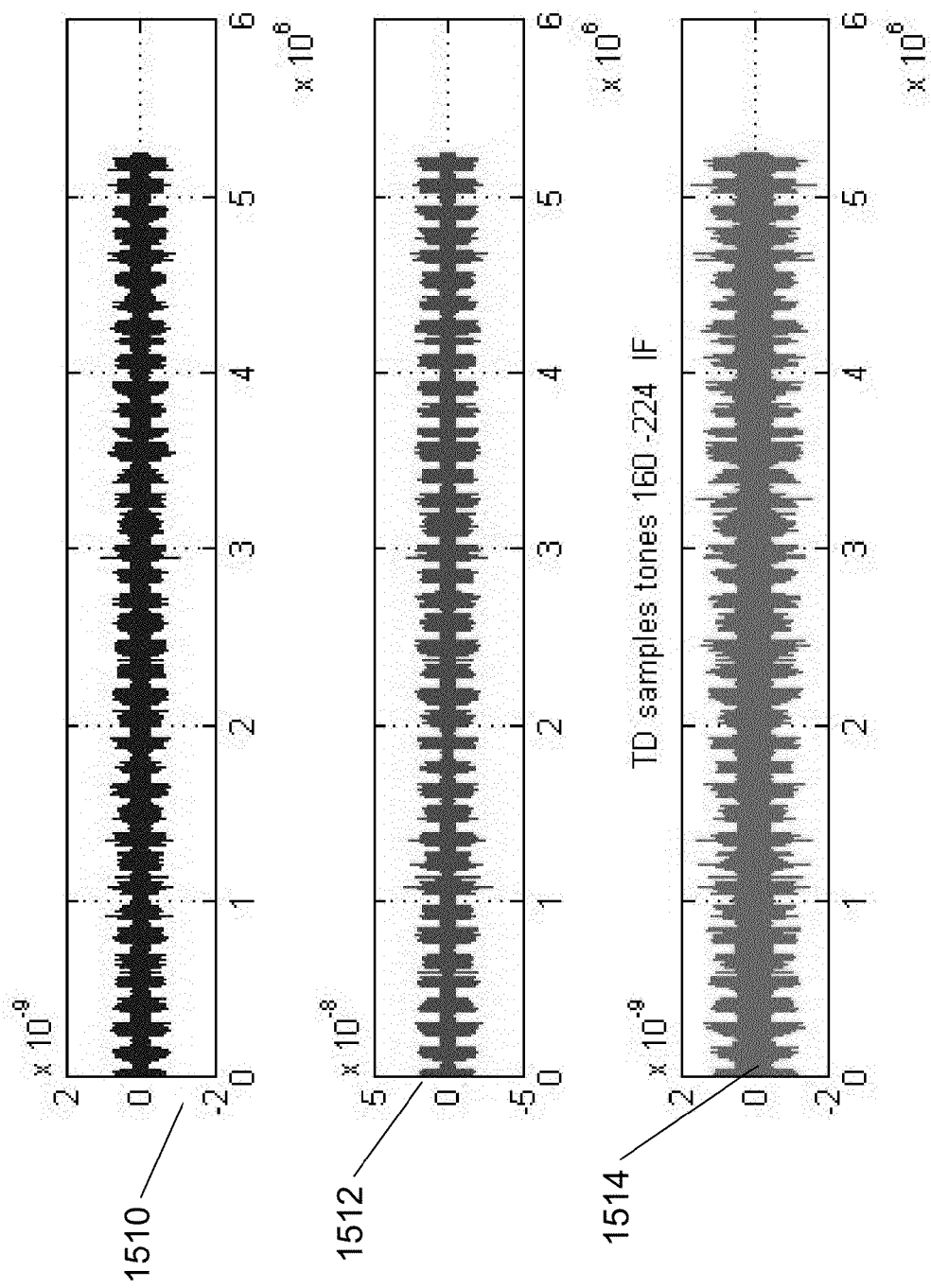

FIG. 15a illustrates the signals present in a typical house environment. Across 17 MHz (VDSL bandwidth of interest), three PSDs of signals are displayed. A CM signal PSD 1502 on the twisted pair, a DM signal PSD 1504 on the twisted pair and a powerline Hot Neutral signal PSD 1506 with 30 dB attenuation on a power outlet onto which the CPE modem is connected. All three curves show peaks 1508 located at the same frequencies, thereby illustrating the high level of correlation of the three noise signals DM, CM and PL. FIG. 15b provides a time domain view of the frequency domain samples collected over a window of 5.5 MHz to 7.7 MHz, for the DM signal 1510, CM signal 1512 and PL signal 1514. There again a similar time domain structure of the noise is detectable on all three signals, further justifying the benefits of looking at these signals in search of correlation.

Figure 16A:
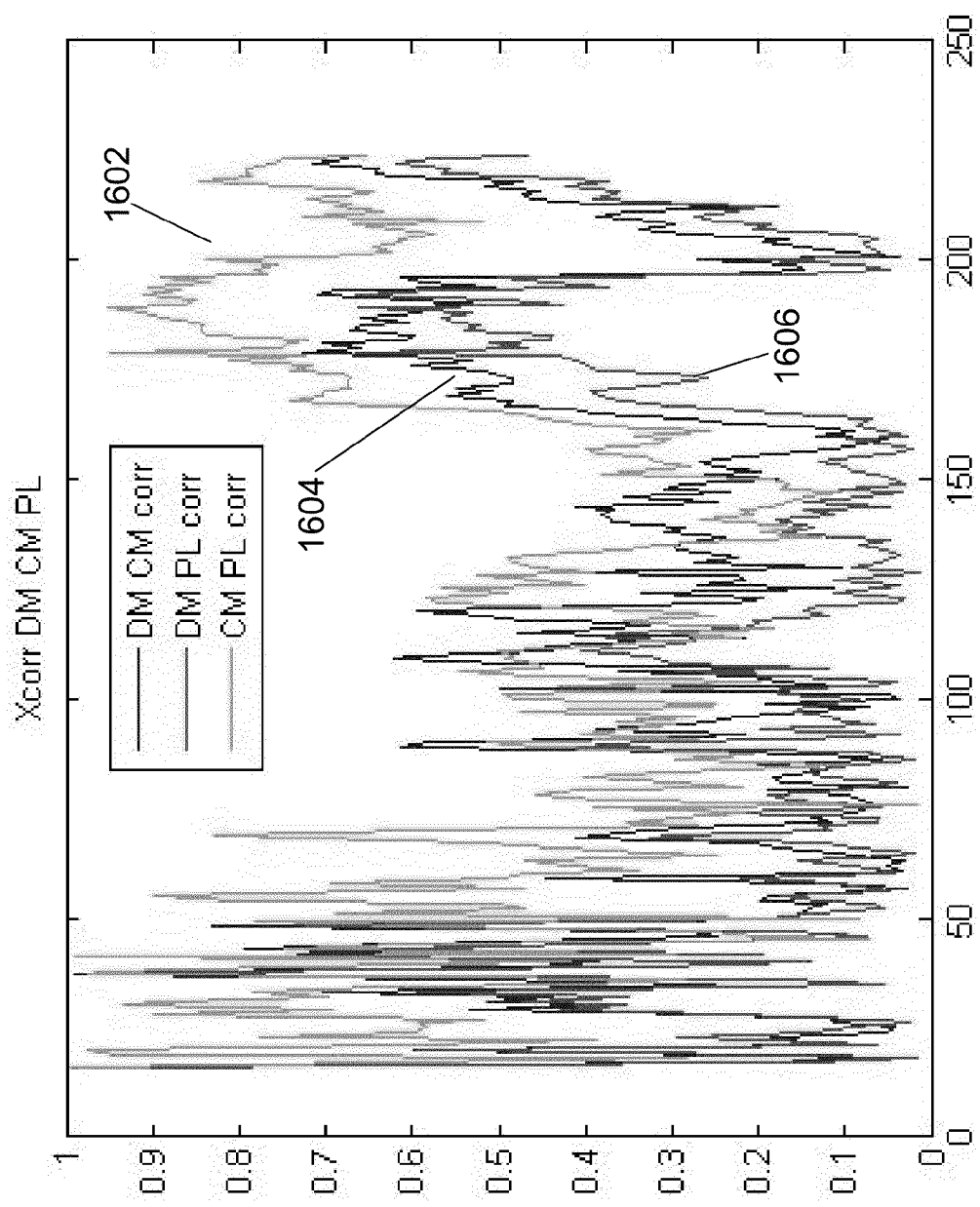
FIGS. 16*a* and 16*b* are graphs illustrating various projections of powerline noise in an example CPE environment.
Figure 16B:
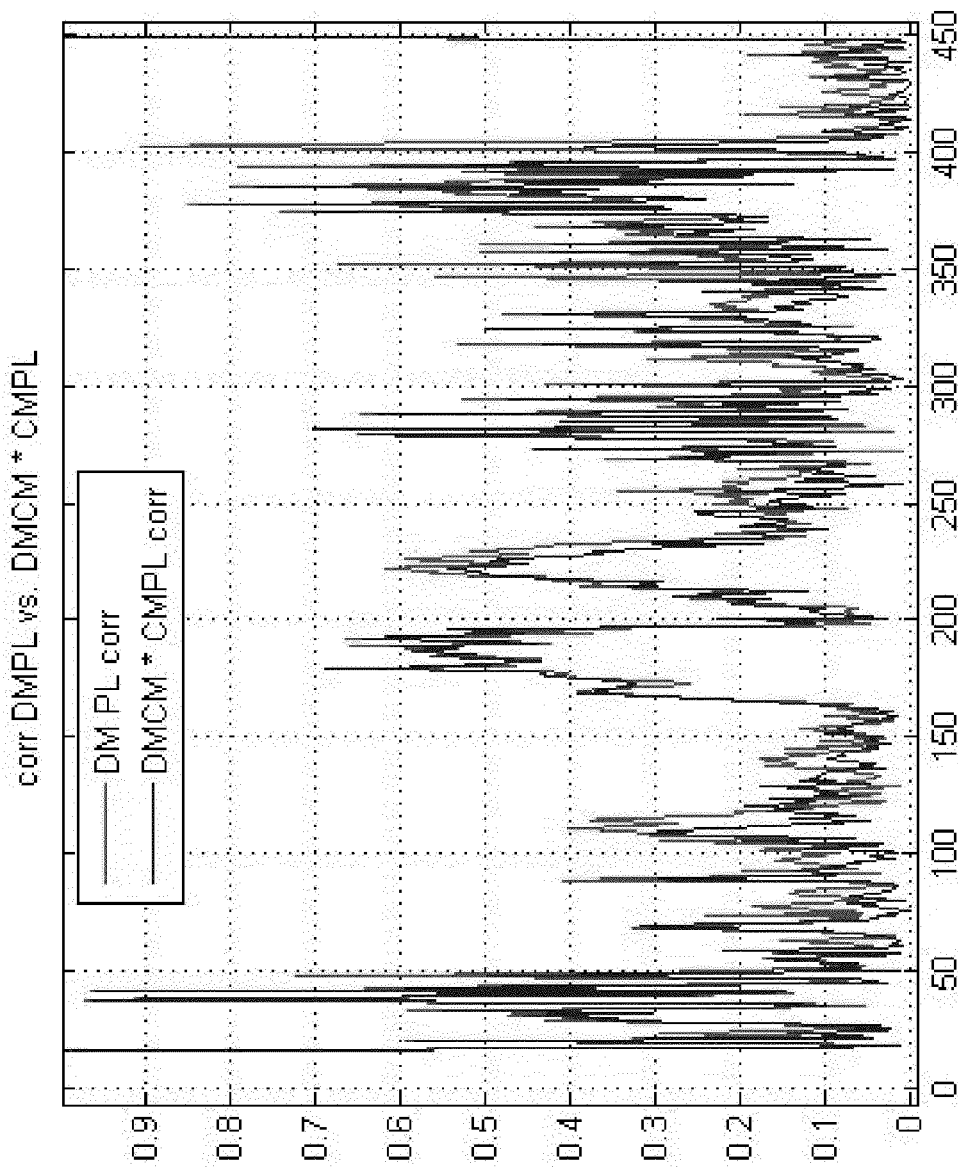

FIG. 16a illustrates the normalized correlation results of two of the signals at a time over the first 8 MHz bandwidth. Curve 1602 consists in the correlation of CM and PL samples. Curve 1604 corresponds to correlation of CM and DM samples, while curve 1606 corresponds to the correlation of DM and PL samples. It is worth noticing that the CM-PL correlation 1602 is the highest, while the DM-PL correlation 1606 is the lowest. FIG. 16b further gives insight into these results, by comparing the correlation results of DM and PL samples to the results obtained by multiplying the correlation results of CM to DM by the correlation results of PL to CM. The relative matching of the two sets of curves derived as explained earlier comports with the observation that a power line noise signal will couple to a differential mode signal on the twisted pair in a two-step process, which consists of a conversion of PL noise into a CM noise on the twisted pair and then a conversion of the CM noise into a DM noise on the twisted pair.

Figure 17A:
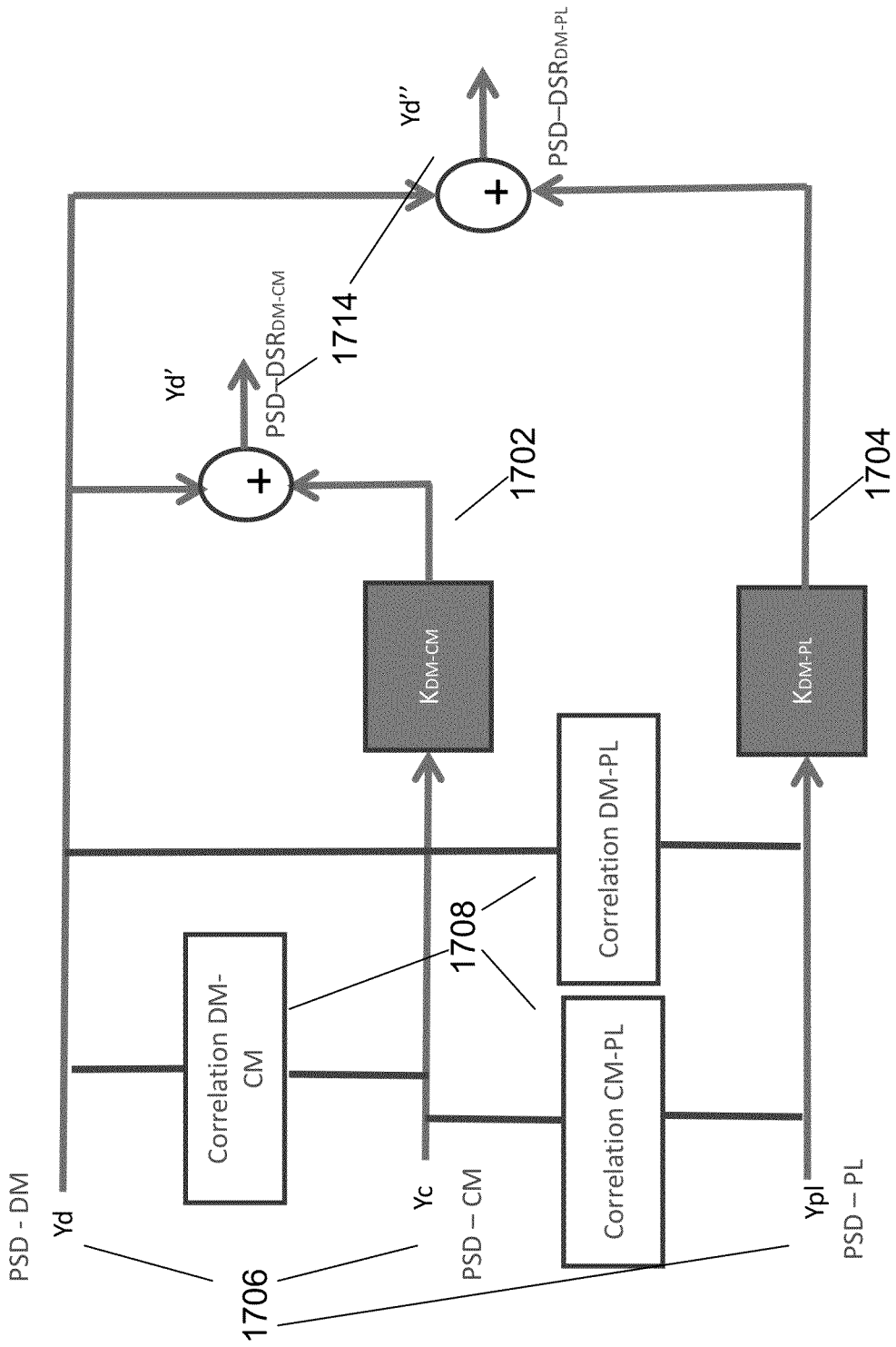
FIG. 17*a* is a block diagram illustrating an example architecture for measuring PSD, calculating correlation and cancelling various projections of noise according to embodiments of the invention.
Figure 17B:
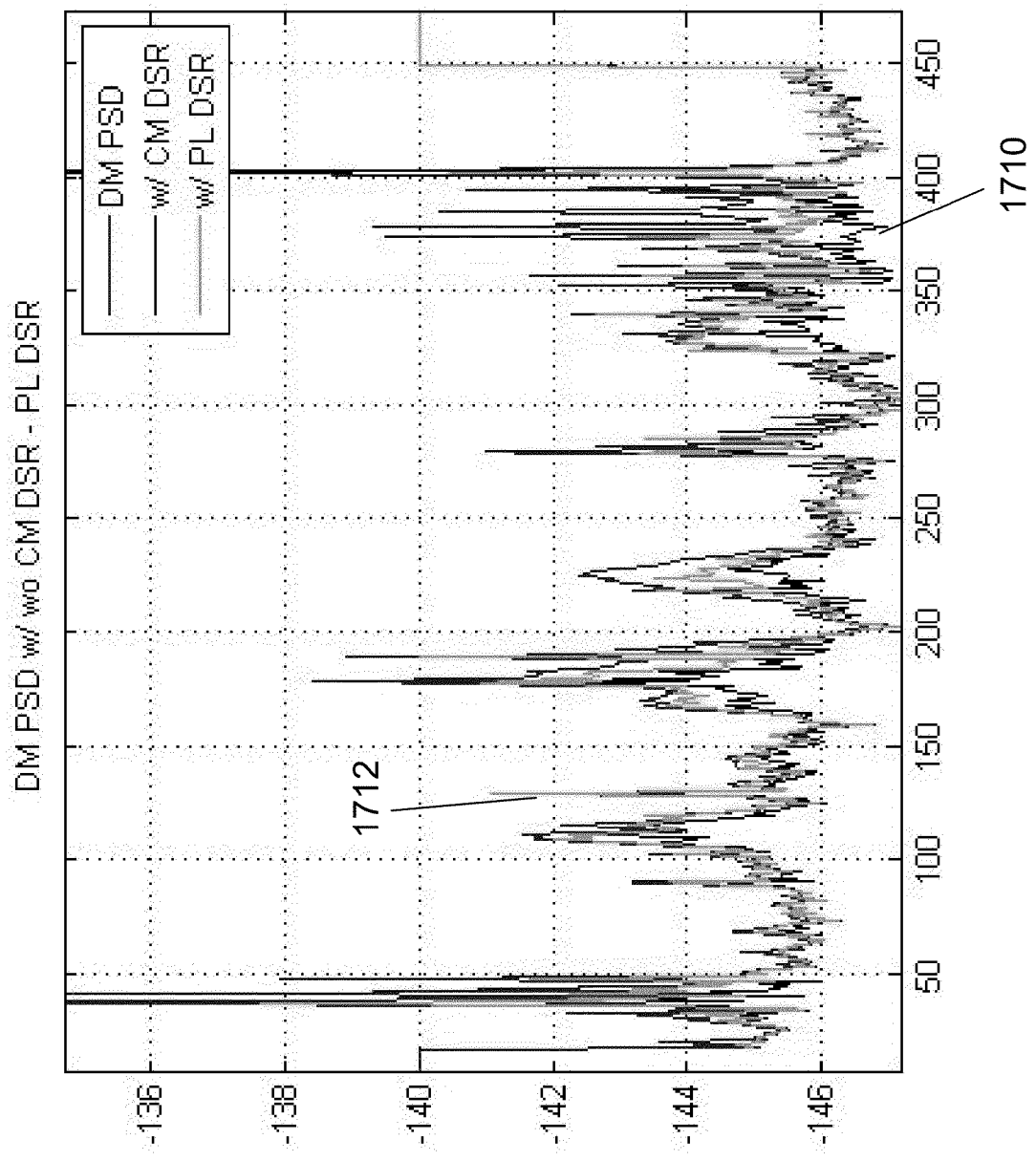
FIG. 17*b* is a graph illustrating an example PSD at the output of cancellers shown in FIG. 17*a* after recombination with a DM signal.

FIG. 17a illustrates from which input signals the various quantities of PSD 1706 and correlation 1708 derived in connection with FIGS. 15 and 16 are obtained. FIG. 17a also illustrates the presence of two cancellers $K_{DM-CM}$ 1702 and $K_{DM-PL}$ 1704 that operate respectively on DM and CM inputs Yd and Yc, and on DM and PL inputs Yd and Ypl in order to yield from adders 1714 each an output Yd' and Yd", in which correlated noise from the CM sensor and of the PL sensor have been removed respectively by cancellers $K_{DM-CM}$ and $K_{DM-PL}$. FIG. 17b illustrates the PSD at the output of those cancellers after recombination with the DM signal. One can appreciate that with each canceller the noise PSD output is reduced with respect to the PSD of the DM mode signal, thereby illustrating the process by which DM correlated noise with each of the sensor CM and PL has been removed. It is worth noting that the PSD with the Dual Sensor Reference input as CM (curve 1710) is generally lower than the PSD with the Dual Sensor Reference input as PL (curve 1712). These results concur with the observation that less correlation is observed between the PL sensor and the DM sensor, as compared to the correlation observed between the CM sensor and the DM sensor. In both scenarios, noticeable improvement is observed with any of the two sensors for the purpose of mitigating correlated noise in the DM line, thereby justifying the value of using a PL sensor as a substitute or complimentary sensor to a CM sensor for the purpose of mitigating external noise that impacts the DSL line.

As described below, embodiments of the invention generate a sensor signal from an AC power supply wall wart that typically includes a two or three prong plug on one end for connecting to a wall outlet of a power mains and a jack on the other end for connecting to a DC power supply port of a DSL modem. The extra sensor can be used as an alternative to, or jointly with other secondary sensors, such as a common mode sensor. The combination of the power sensor output with the primary sensor of the DSL line can be performed in the frequency domain and/or time domain, with various possible alternatives. An advantage of the invention lies in the sensing of AC power noises on the medium where they originate—the in-house power mains network, as they couple to the DSL line used in the house.

According to additional aspects, the present inventors also recognize some limitations with the use of a sensor coupled to a DC power supply output. For example, the DC power supply is designed to filter unwanted AC noise. A significantly attenuated noise should consequentially only be measurable. However, observations with HP-AV noise suggest that since a non-insignificant signal level is measured on the DSL port without being connected externally to a cable, there should be some usable signal level at the DC power supply output. The signals from the power supply sensor may not only contain AC noise of interest from the mains, but it may also contain noises generated by devices on the board within the modem. Proper isolation of the sensor to these unwanted board noises is therefore required.

Figure 6:
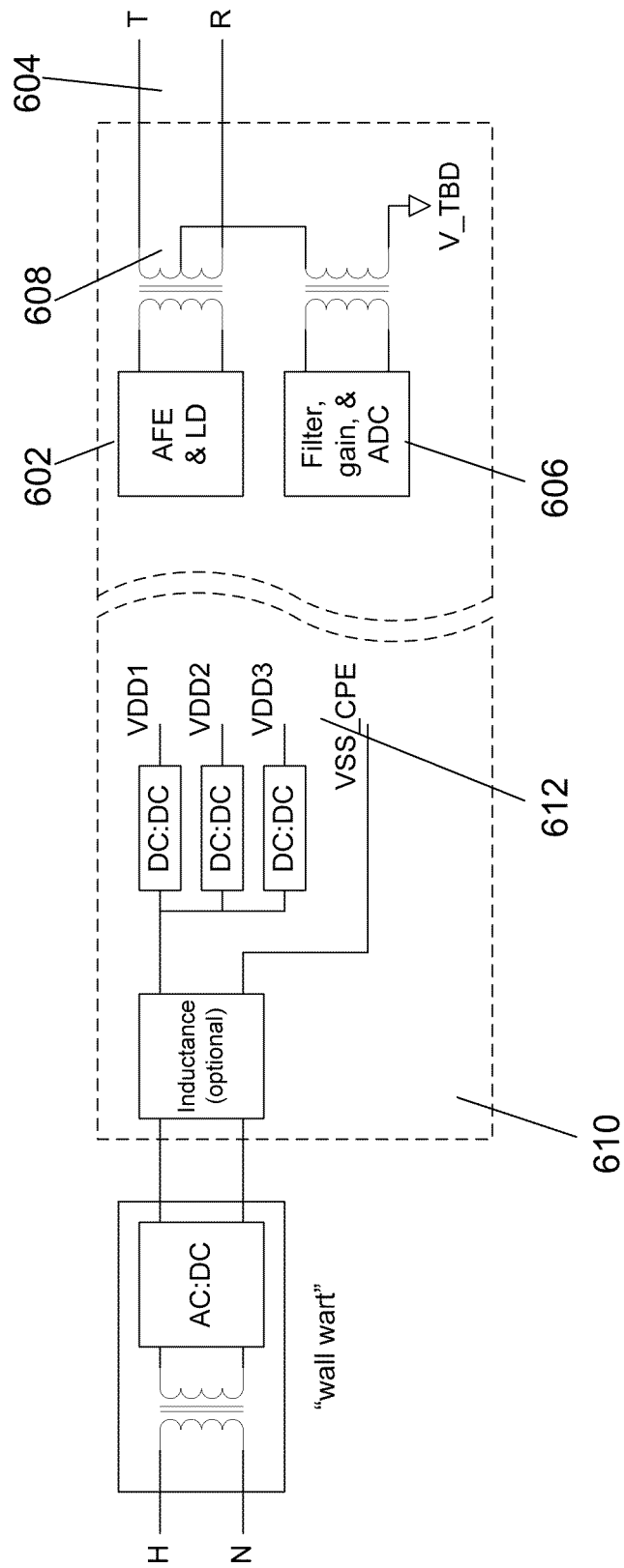
FIG. 6 illustrates a Legacy Common Mode Sensor used in a dual sensor receiver.

FIG. 6 depicts a legacy common mode sensor used in a dual sensor DSL transceiver. Conventionally, a CM noise sensor is applied at the T&R pair, and the signal thereof has been traditionally considered for use to cancel the converted CM noise onto the DM port. As shown in FIG. 6, the primary connection of the AFE and Line Driver 602 is the DM connection to the T&R pair to sense the differential DSL signal. An additional sensor 606 connects between the midpoint of the T&R transformer 608 and a reference point to sense a replica of the CM signal that is present on the T&R with respect to a reference ground. FIG. 6 further depicts the modem power supply unit 610, as it exists today and which generates DC reference voltages 612 for the modem operation. In this configuration, the dual sensor receiver consists of a traditional DM sensor 602 and a CM sensor 606, which can be used jointly either to characterize the unwanted CM noise sources which convert from CM to DM (Characterization), or to mitigate the impact of the CM noise conversion into the DM DSL signal (cancellation).

Figure 7:
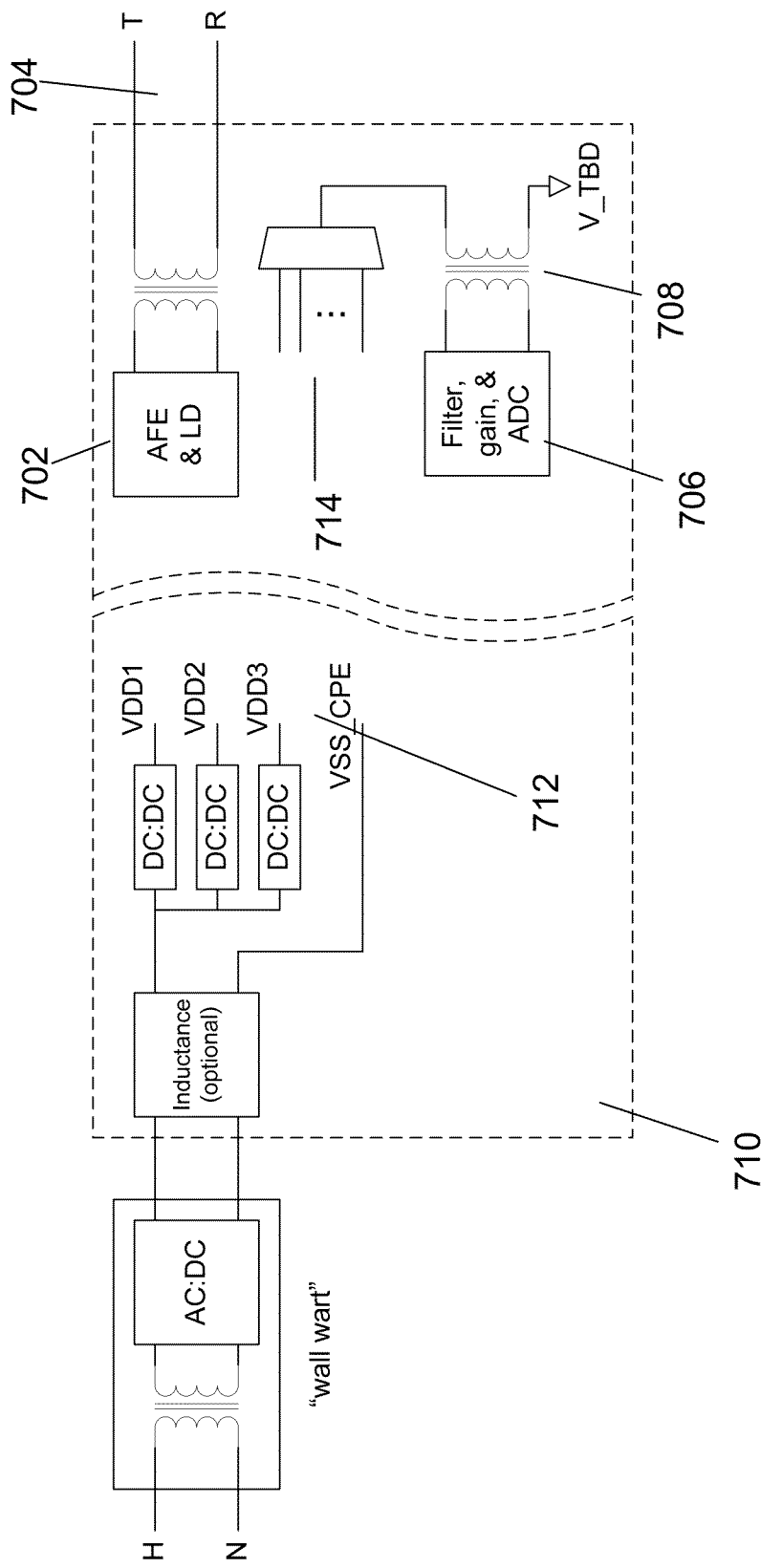
FIG. 7 illustrates an example Power Line Sensor in a Dual Sensor Receiver according to embodiments of the invention.

FIG. 7 depicts a power line sensor used in embodiments of a DSL transceiver according to certain aspects of the invention. As shown in FIG. 7, the primary connection of the AFE and Line Driver 702 is still the differential mode connection to T&R 704 to sense the DM DSL signal. An additional sensor 706 connects through a transformer 708 to one of Voltage points derived from the Power Supply mains and a reference point V_TBD via input 714, in order to sense a replica of the noise signal that is present on the power supply mains. FIG. 7 further depicts the modem power supply unit 710, which generates the various DC reference voltages 712 for the modem operation, which can be one of the points to which the alternative sensor 706 can be connected. In this example configuration, the dual sensor receiver consists of a traditional DM sensor 702 and a power line sensor 706, which can be used jointly either to characterize the unwanted power mains noise sources which couple to CM on the twisted pair and then to convert to DM (Characterization), or to mitigate the impact of noise sources originating from the power mains and which get converted into DM, thereby affecting DSL signals (cancellation).

Various implementations of input 714 that couple a power line sensor 706 to voltage points in the power supply mains in FIG. 7 will now be described.

Figure 8:
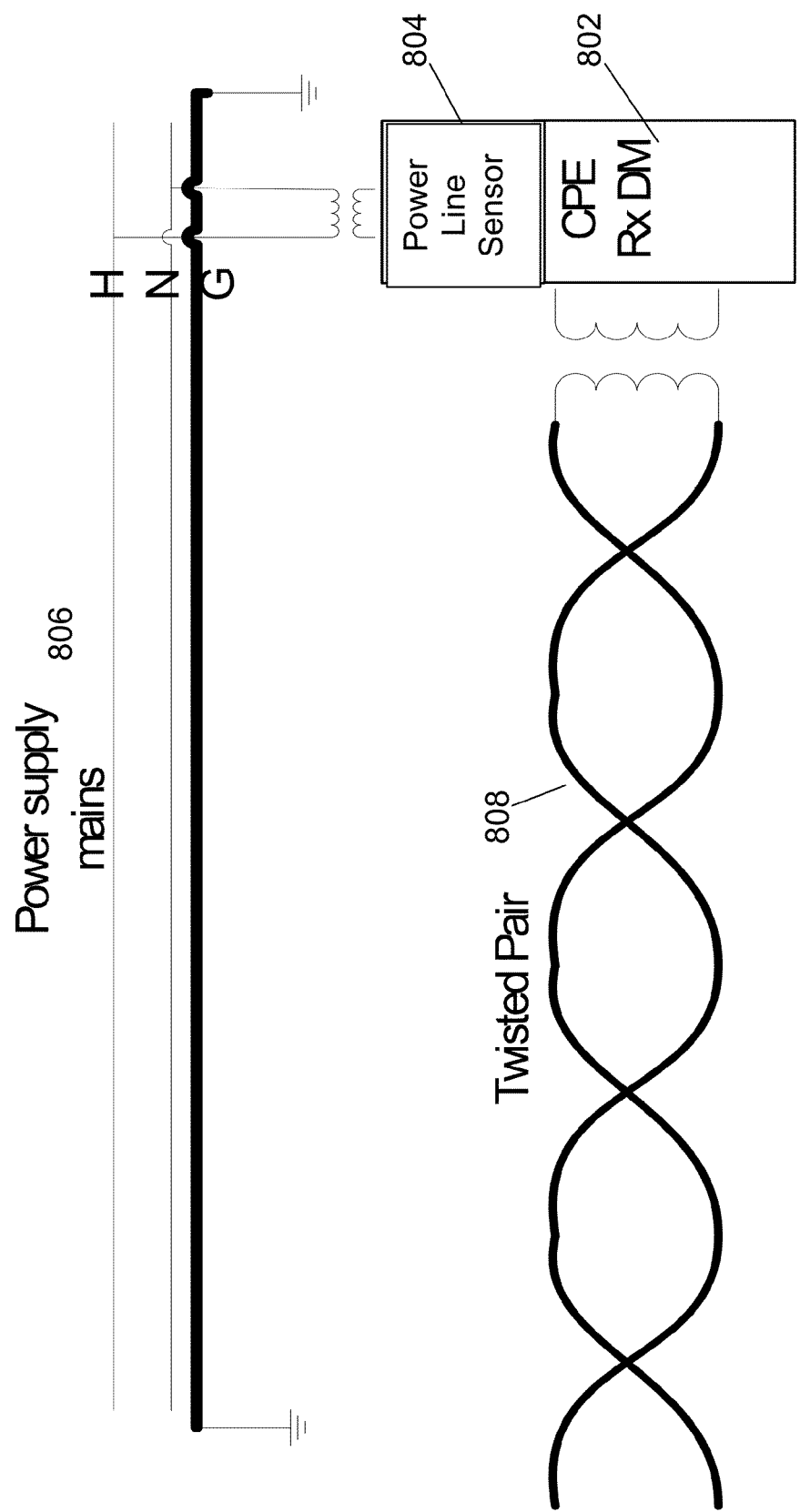
FIG. 8 illustrates one example implementation of Power Line sensor according to the invention.

One example implementation is illustrated in FIG. 8. In FIG. 8, power line sensor 804 couples to voltage points Hot and Neutral in the power mains 806. FIG. 8 further shows a primary sensor 802 coupled to sense the differential mode data signal on the twisted pair 808 (e.g. a DSL signal).

Figure 9:
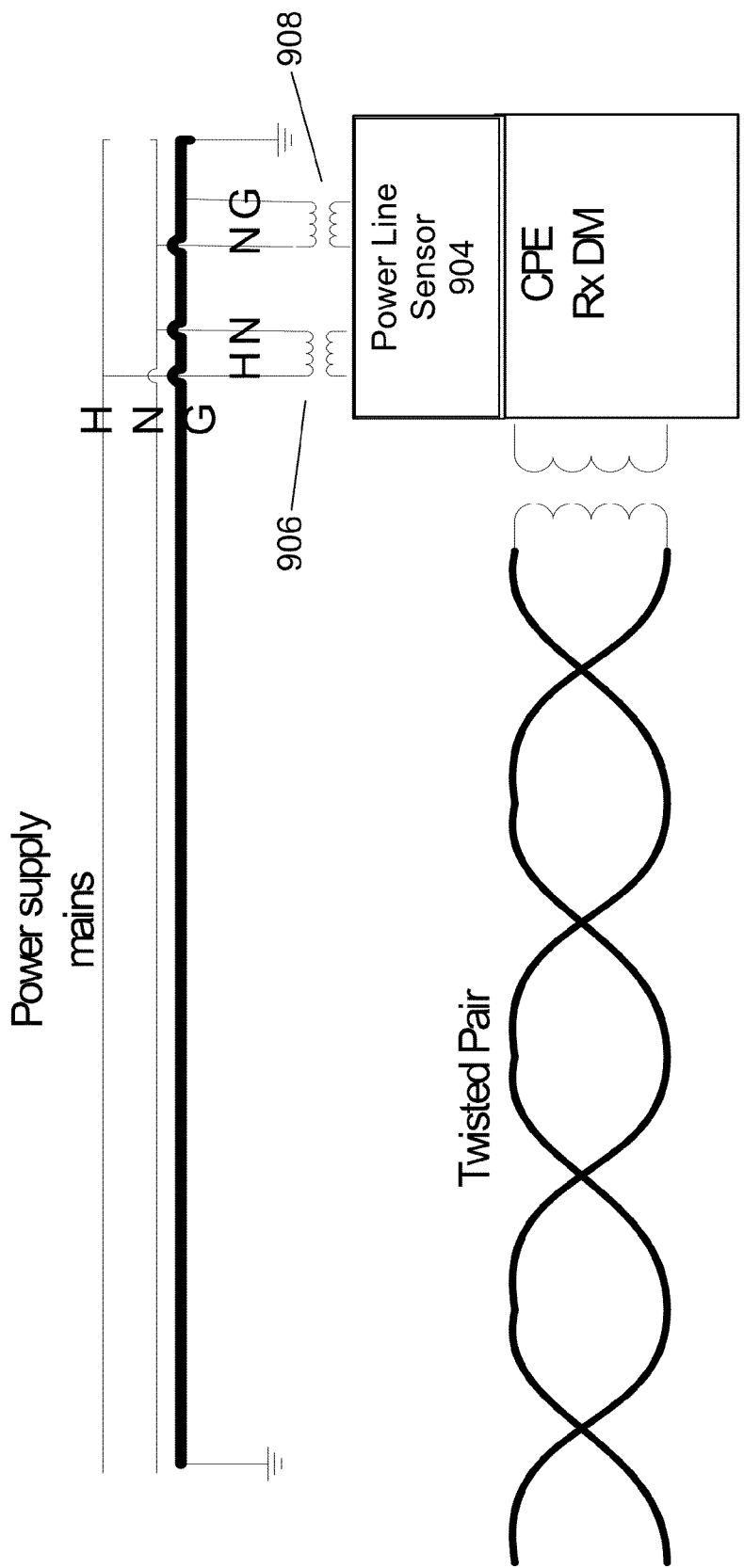
FIG. 9 illustrates another example of a power line sensor including Dual sensors using Hot & Neutral and Neutral & Ground connections according to the invention.

While the example in FIG. 8 exploits the features of a typical wall wart, which has two prongs connecting to Hot and Neutral via a wall outlet, two sensors may be derived if access to Ground is made possible (e.g. by a third prong on a wall wart). This is illustrated in FIG. 9. As shown in FIG. 9, power line sensor 904 includes sensor 906 coupled to Hot and Neutral and sensor 908 coupled to Neutral and Ground. Using various wire connections to Hot, Neutral and Ground, the two sensors 906 and 908 can be realized in various ways. The noise signal can be sensed between Hot and Neutral, or between Neutral and Ground, or between Hot and Ground.

Figure 10:
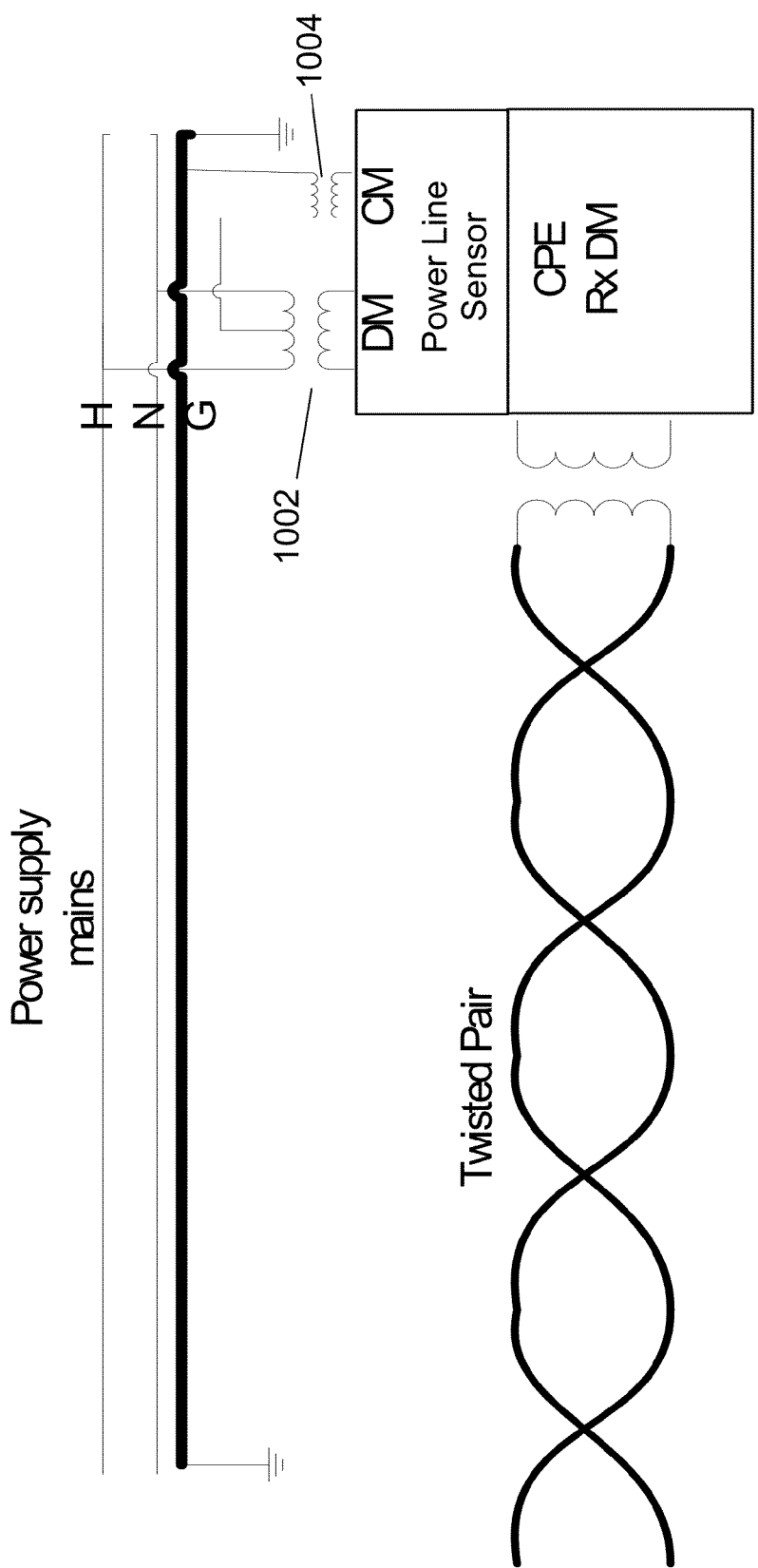
FIG. 10 illustrates another example of a power line sensor including dual "DM and CM" sensors according to the invention.

Additionally or alternatively, it is noted that AC signals such as power line communication signals, such as HP-AV, are transmitted differentially between Hot and Neutral on the power mains network and may convert into CM with respect to ground due to the imbalance of the power mains network. Accordingly, another possible implementation is shown in FIG. 10. As shown in FIG. 10, before those DM signals couple into the CM mode of the twisted pair, a differential and common mode circuit can be devised that connects to the power mains network 1006 in order to provide two independent outputs from the three wire connections. A first power line sensor 1002 is connected between the Hot and Neutral wires, while a second power line sensor 1004 is connected at the mid-point of the first sensor and the ground wire, in order to sense the CM signal present on the power supply mains, and which is believed to couple into the CM signal of the twisted pair.

Figure 1:
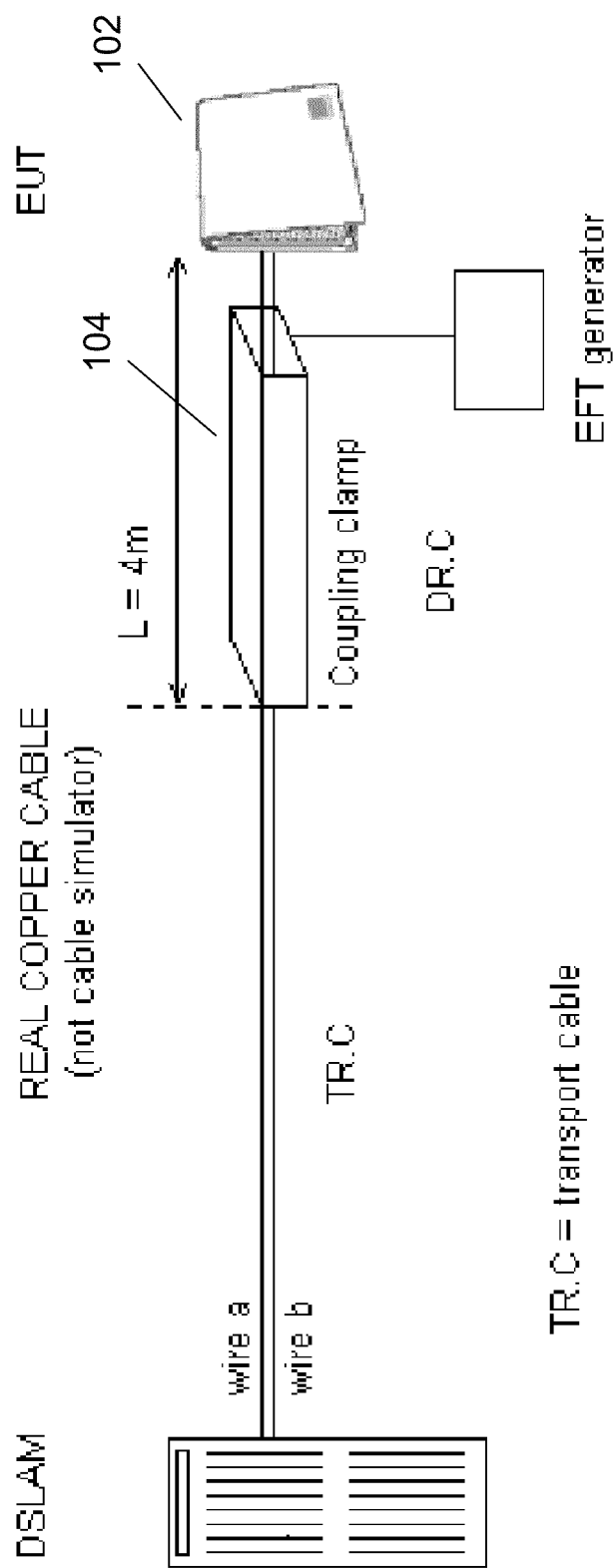
FIG. 1 is a diagram that illustrates EFT injection on telecom port, representing a coupling between the in-house power line and the DSL line.
Figure 2:
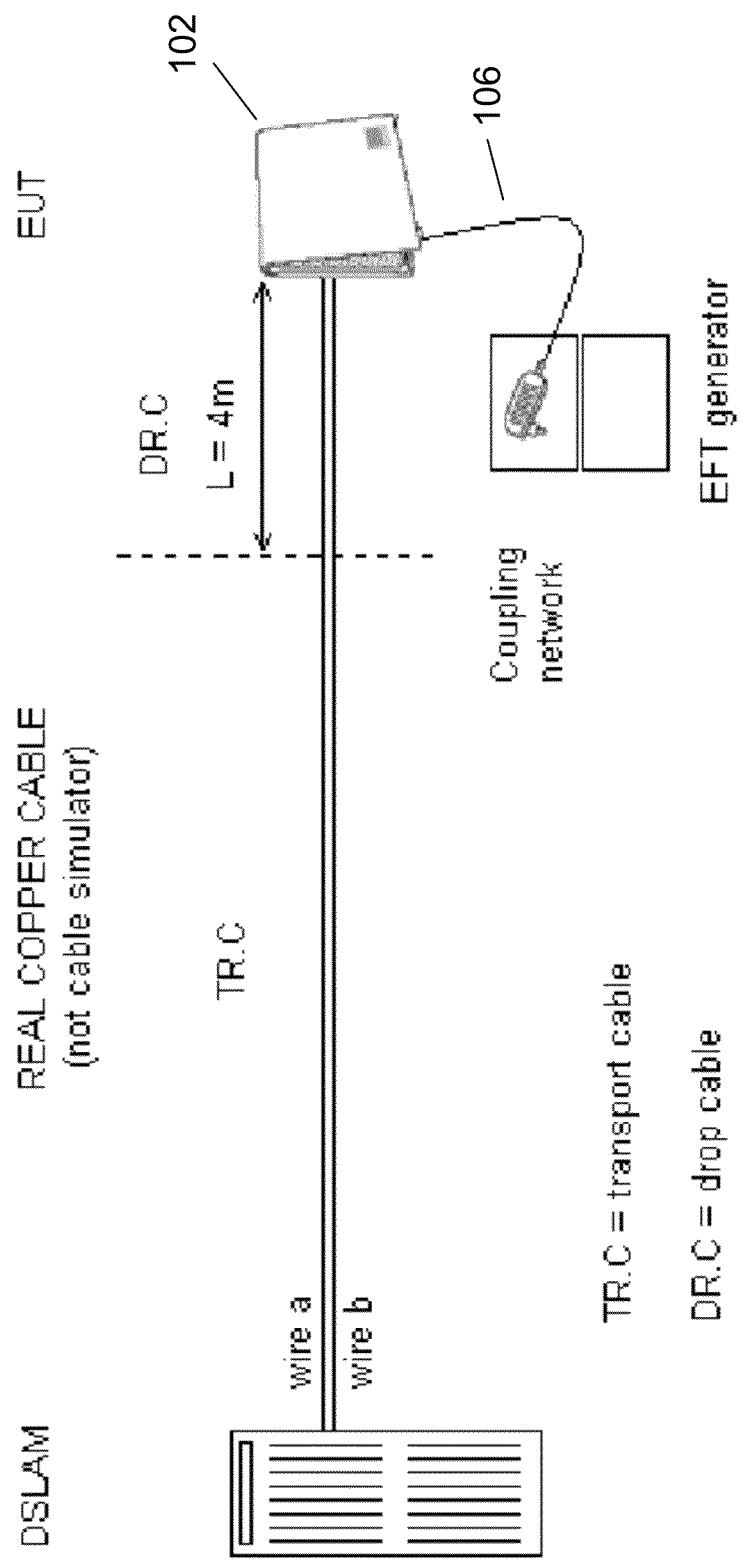
FIG. 2 is a diagram that illustrates EFT injection on power supply port, representing a coupling path through the power supply cable onto the DSL line.
Figure 3:
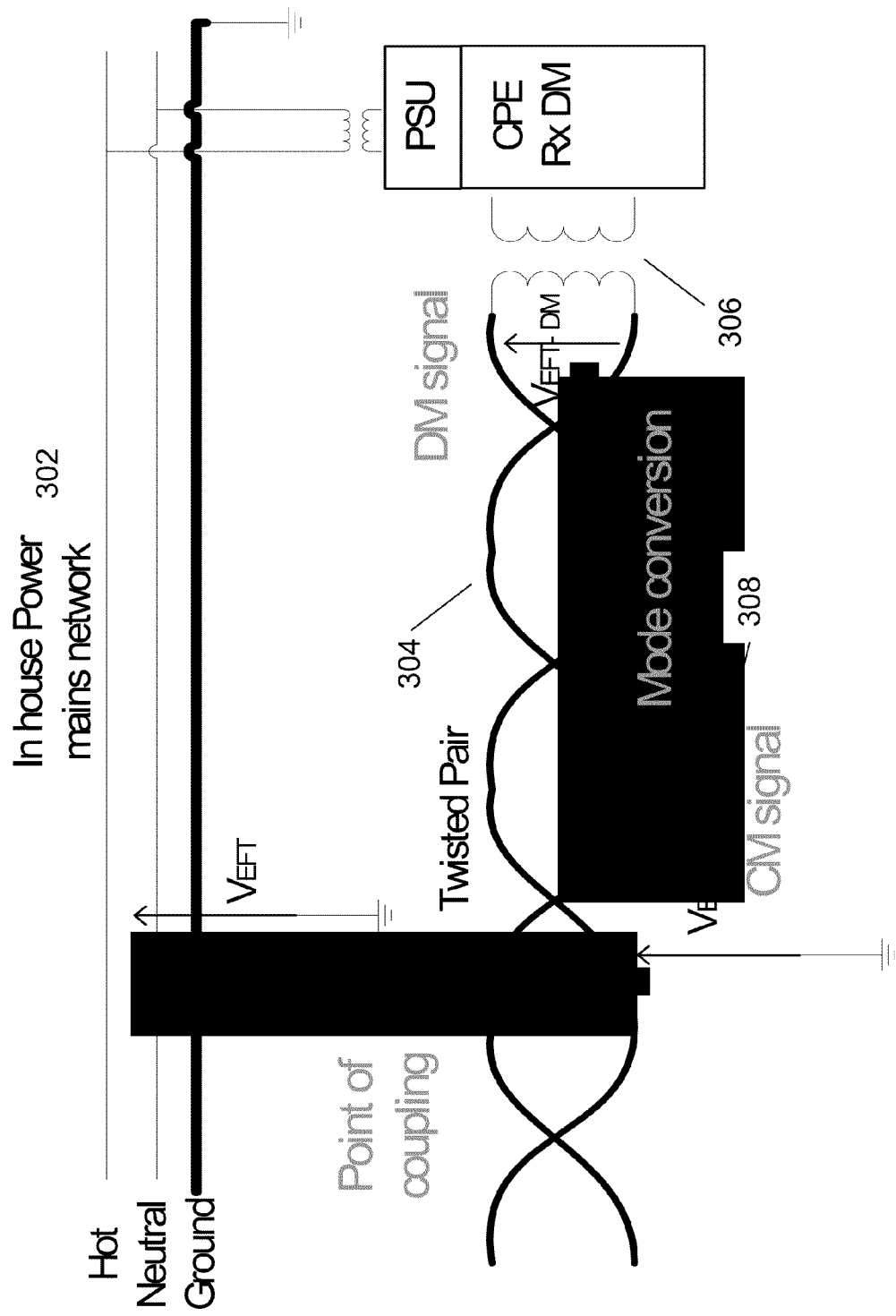
FIG. 3 illustrates signal conversion through loop imbalance after capacitive coupling of in house mains network and twisted pair.
Figure 4:
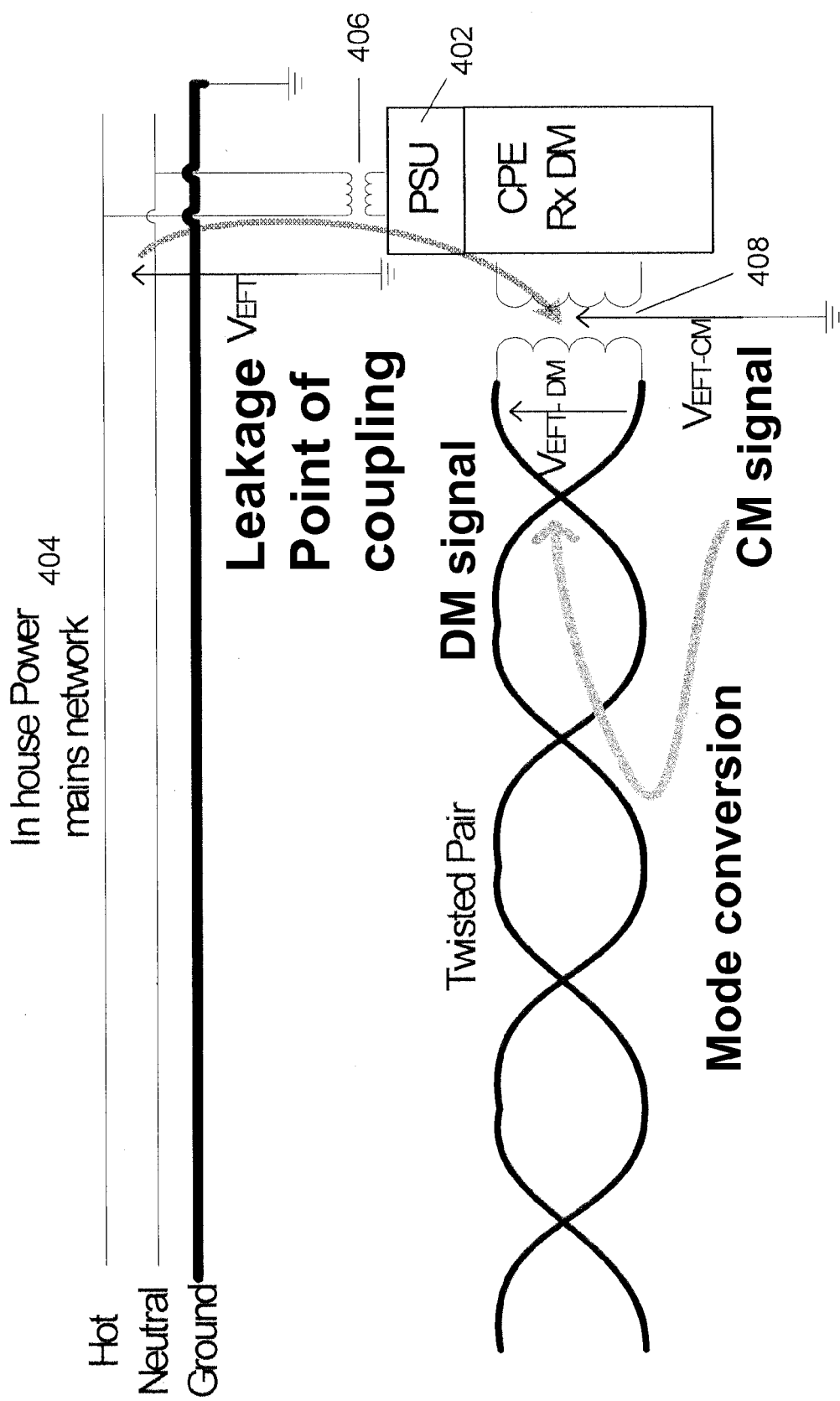
FIG. 4 illustrates signal conversion through loop imbalance after leakage of in house mains network noise through the power supply unit (PSU)
Figure 5:
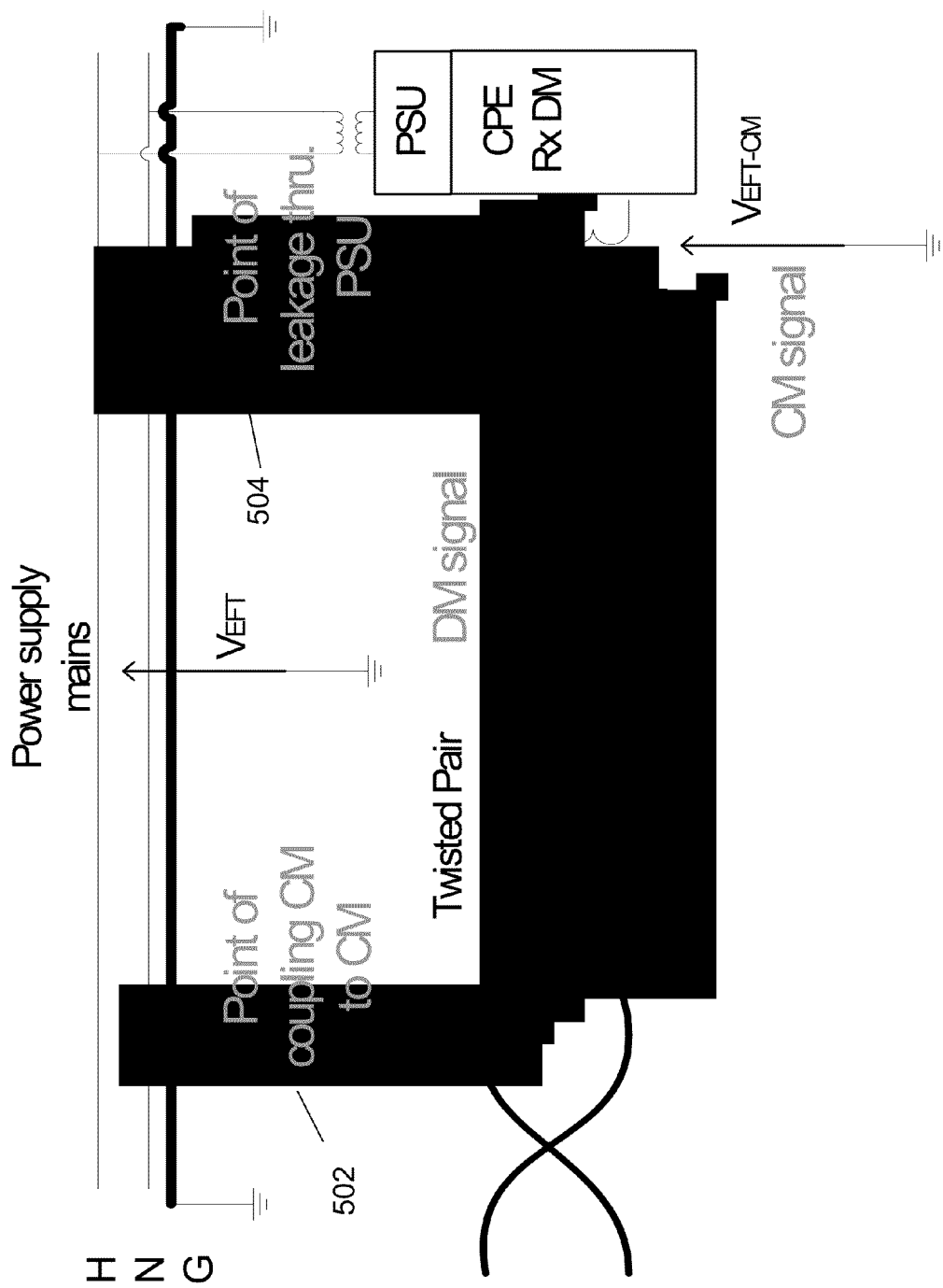
FIG. 5 illustrates superposition of coupling paths.

In the case of a single point of coupling of external noise from power mains into the DSL cable, it is believed that a single CM sensor at T&R is sufficient to help cancel multiple noise sources that couple into the DM channel due to the fact that the mode conversion between CM and DM is determined by a single transfer function. This single mode conversion is represented in FIG. 3, even if there are multiple noise sources on the power mains. As discussed above in connection with FIG. 5, however, in case of multiple points of coupling, the principle of superposition would hold only if the noise source on the power supply is unique or at least identical at the two points of coupling into the DSL line. In this situation also, a single CM sensor may be sufficient to mitigate the projected noise source, even if two coupling paths exist.

However, when there are multiple noise sources and more than one coupling path, the principle of superposition may no longer hold. For example, degeneracy is introduced, so a single CM sensor may not be sufficient to mitigate the converted DM noises. The degeneracy may be expected since the physical distance of the multiple noise sources on the power mains network with respect to the point of leakage and to the point of coupling with the DSL line may differ.

Figure 11:
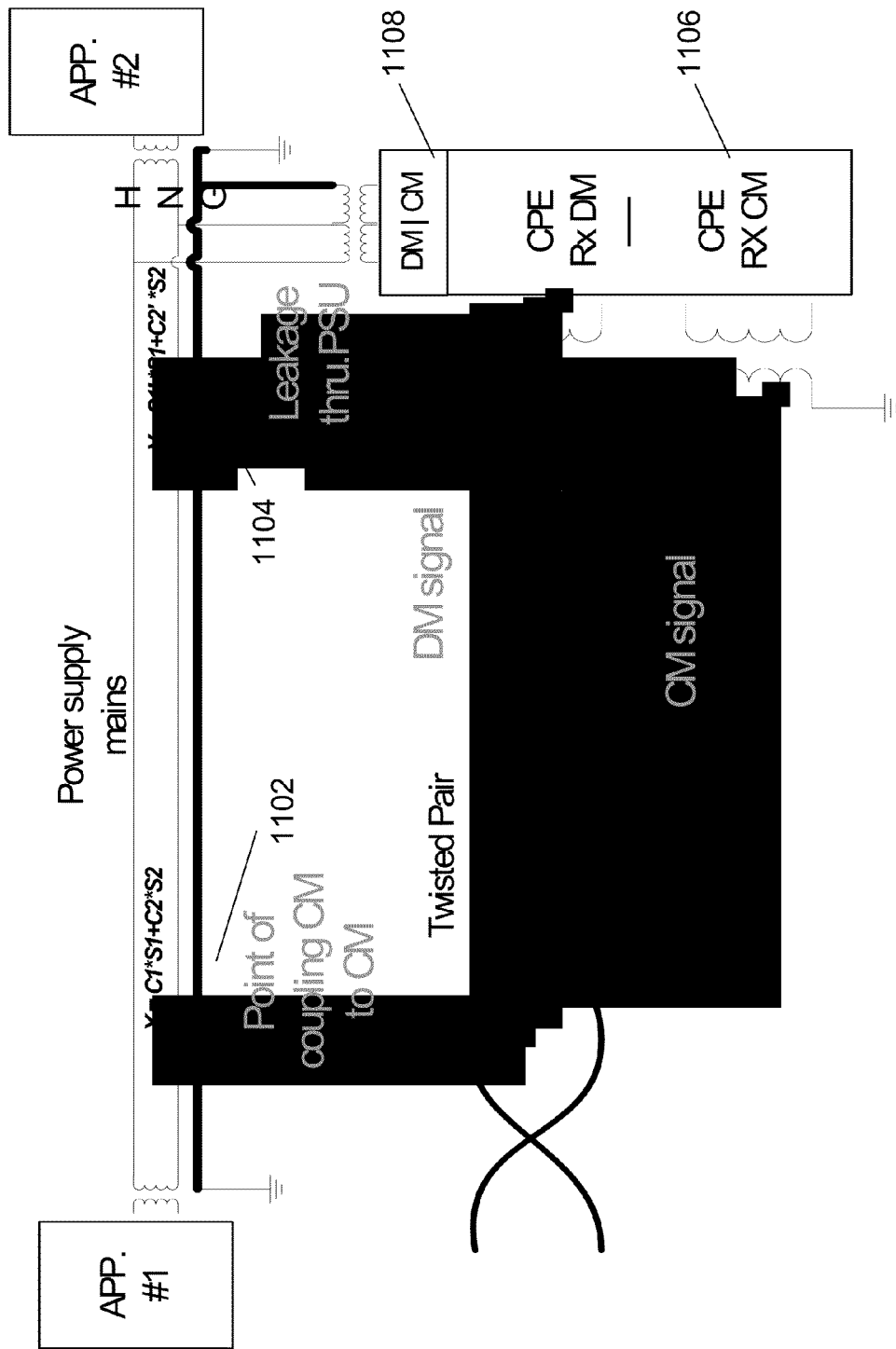
FIG. 11 illustrates degeneracy of coupling paths due to different weighted aggregate noises X and Y.

This situation is illustrated in FIG. 11. As shown in FIG. 11, two separate noise signals S1 and S2 are transmitted by appliance #1 and #2. As further shown in FIG. 11, the actual composition and leakage of the aggregate noise X and Y at the two points of coupling 1102 (capacitive coupling between a portion of the twisted pair and the power mains) and 1104 (through the power supply coupled to a wall outlet), respectively, may differ. This is due to the fact that, for example, point 1102 is closer to appliance #1 on the power mains, making noise signal S1 from appliance #1 more dominant, while point 1104 is closer to appliance #2 on the power mains. This difference in dominance is shown in FIG. 11 as different set of weighting coefficients (C1, C2) and (C1', C2') in the aggregate noise X and Y, respectively. Because of the different sets of weighting coefficients, the two noise signals S1 and S2 project themselves differently via the two points of coupling 1102 and 1104, respectively, and leakage. In such a case of degeneracy, only a dominant noise source could be canceled perfectly (either S1 or S2) using a single CM sensor, if the two noise sources were to overlap in frequency.

Figure 12:
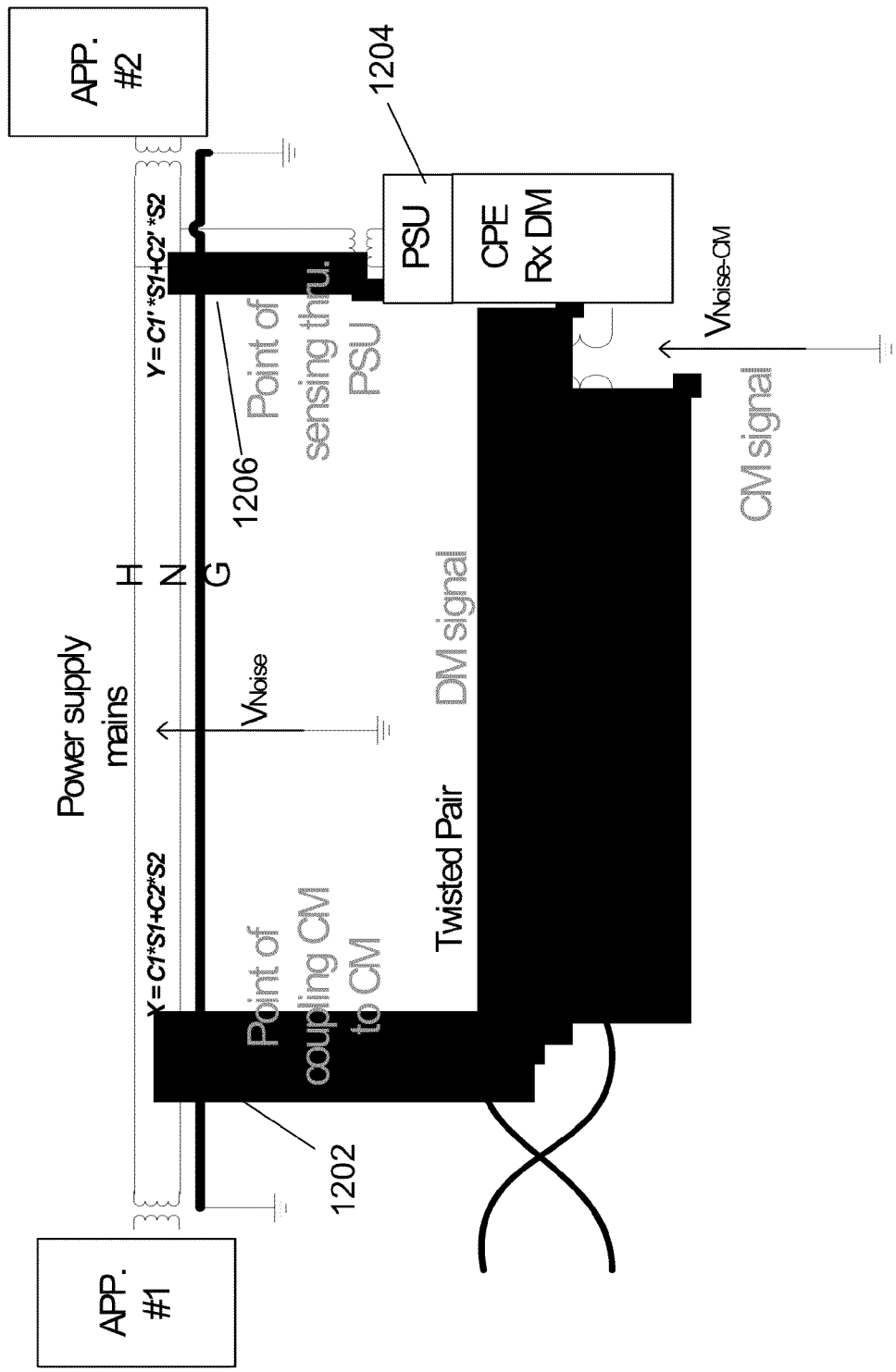
FIG. 12 further illustrates degeneracy of coupling paths due to different weighted aggregate noises X and Y.

Similarly, as shown in FIG. 12, where only one coupling path 1202 is represented, power sensor 1204 senses an aggregate noise Y, made of two noise signals (S1, S2) weighted with weighting coefficients (C1', C2') at point 1206. This situation is subject to the same degeneracy problem, if the aggregate noise X made of the same two noise signals (S1, S2) at the point of coupling 1202 is weighted with different weighting coefficients (C1, C2). In this case degeneracy occurs because the projection of the two signals S1 and S2 through the coupling point 1202 cannot be made to coincide simultaneously with the projection of the same two signals S1 and S2 sensed through the power sensor 1204.

While a power line sensor may be an alternative to a secondary CM sensor, embodiments of the invention also concurrently use a secondary CM sensor 1106 and one or more power sensors 1108, as illustrated in FIG. 11. The additional sensor(s) give additional degrees of freedom to lift the degeneracy of the noise projection onto the DSL line, in case there are multiple noise sources or multiple coupling paths that do not satisfy to the principle of superposition.

Figure 13:
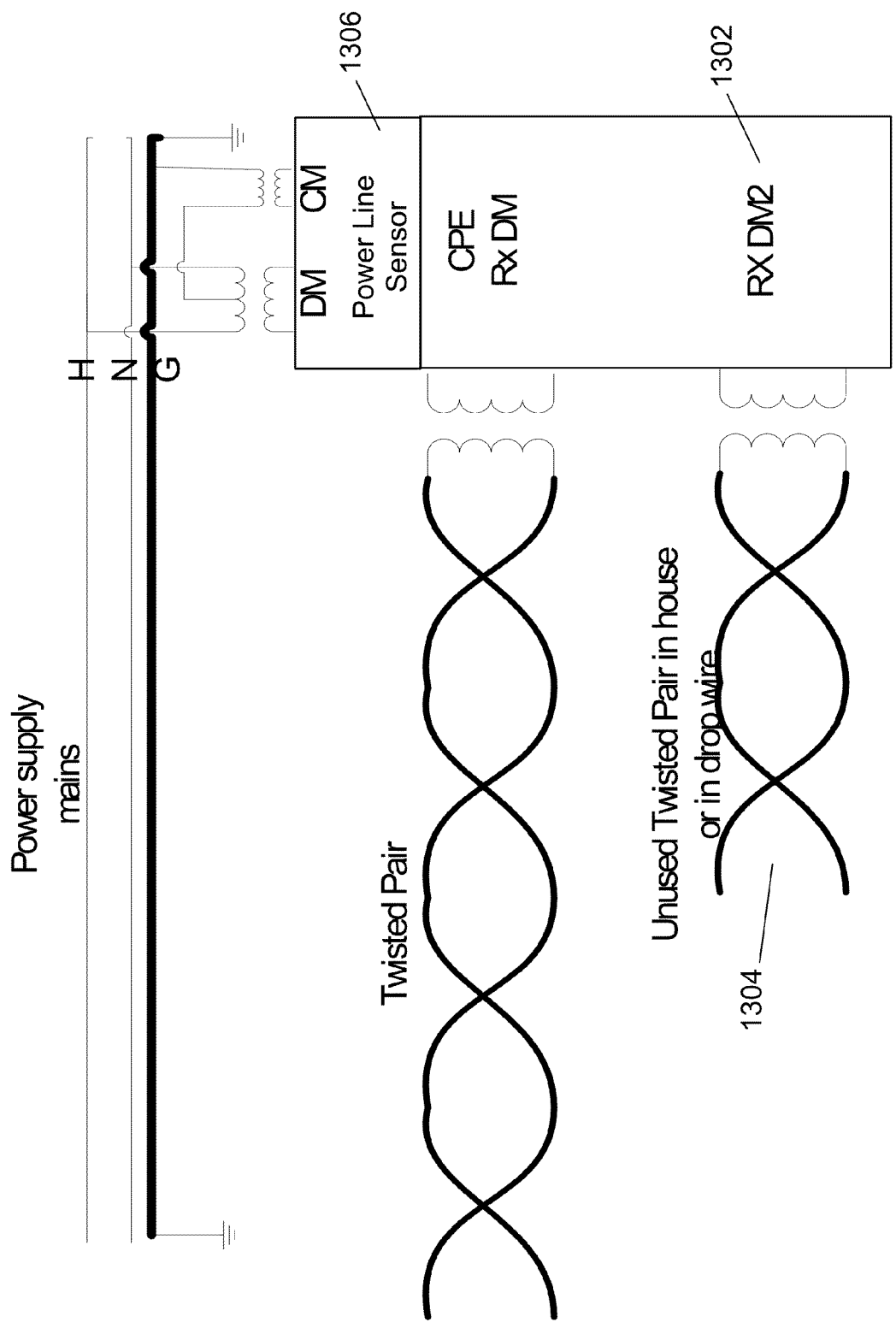
FIG. 13 illustrates concurrent use of a power line sensor(s) with a secondary DM sensor(s) on an unused pair according to embodiments of the invention.

Additionally or alternatively, as shown in FIG. 13, the secondary sensor with which the power line sensor 1306 can be used concurrently can be a differential sensor 1302 coupled to an unused pair in the "in-home cable" 1304, since common practice by operators is to use two pair cabling within the residence. Cable 1304 could also be another unused twisted pair of a drop cable connected to an outside plant drop cable which may or may not be connected to the F2 Cables (secondary distribution cables).

In yet additional or alternative embodiments, as shown in FIG. 14, a power line sensor 1402 according to the invention can be used concurrently with a phantom mode (PM) sensor between two differential DSL pairs 1406 and 1408 whether or not both are being used in a bonding environment.

Some considerations for example implementations of a power line sensor according to the invention are as follows.

One consideration is that it should provide a differential signal on low voltage DC (maybe AC in rare instances) input from an external "wall wart" supply. The DC power supply in a CPE device such as a DSL modem is generally designed to filter out unwanted AC noise. A significant attenuation of the noise source is therefore expected. Hence, an alternative is to derive a differential signal "directly" (but "isolated") from AC power mains (i.e. bypassing HF/RF attenuation from AC:DC conversion stages in an external AC:DC supply).

The power supply sensor signals may not only contain AC noise of interest from the mains, but they may also contain noises generated by the devices on the board. Proper isolation of the sensor to these unwanted board noises is therefore required.

To estimate and cancel possible noise sources interfering on a "primary" DM channel, one of the following possible sources of "secondary" sensors can be used: (1) a CM Sensor; (2) a DM sensor on an unused TP; (3) a phantom sensor between two differential mode twisted pairs; or (4) a power line sensor or a set of sensors on the power supply leads (Hot, Neutral, Ground). Alternatively, the secondary sensor can be a combination of one of the individual sensors above, as a linearly weighted sum of (1) through (4) above.

Alternatively, more than one secondary sensor can be used to estimate and cancel possible noise sources interfering on a "primary" channel. For example, two or more independent secondary sensors can be used with each sensor attached to only one of (1) through (4) above. Or two or more independent sensors can be used with each sensor attached to linearly weighted sums of (1) through (4) above (w/o cross connection). Still further, two or more independent sensors can be used with each sensor attached to linearly weighted sums of filtered versions of (1) through (4) above (w/o cross connection).

The output signals of the "primary" channel and the output of the multiple "secondary" sensors can be combined in the time domain or in the frequency domain to estimate and cancel possible noise sources interfering on a "primary" channel. Combination in the time domain can be done with adaptive linear filtering on the primary and secondary signals of the multiple sensor inputs. In the frequency domain, the two or more FFT output vectors (one primary and one or more secondary) can be linearly combined with a Frequency Domain Equalizer (FEQ)-like set of weights to produce an improved SNR version of the primary path.

Figure 18:
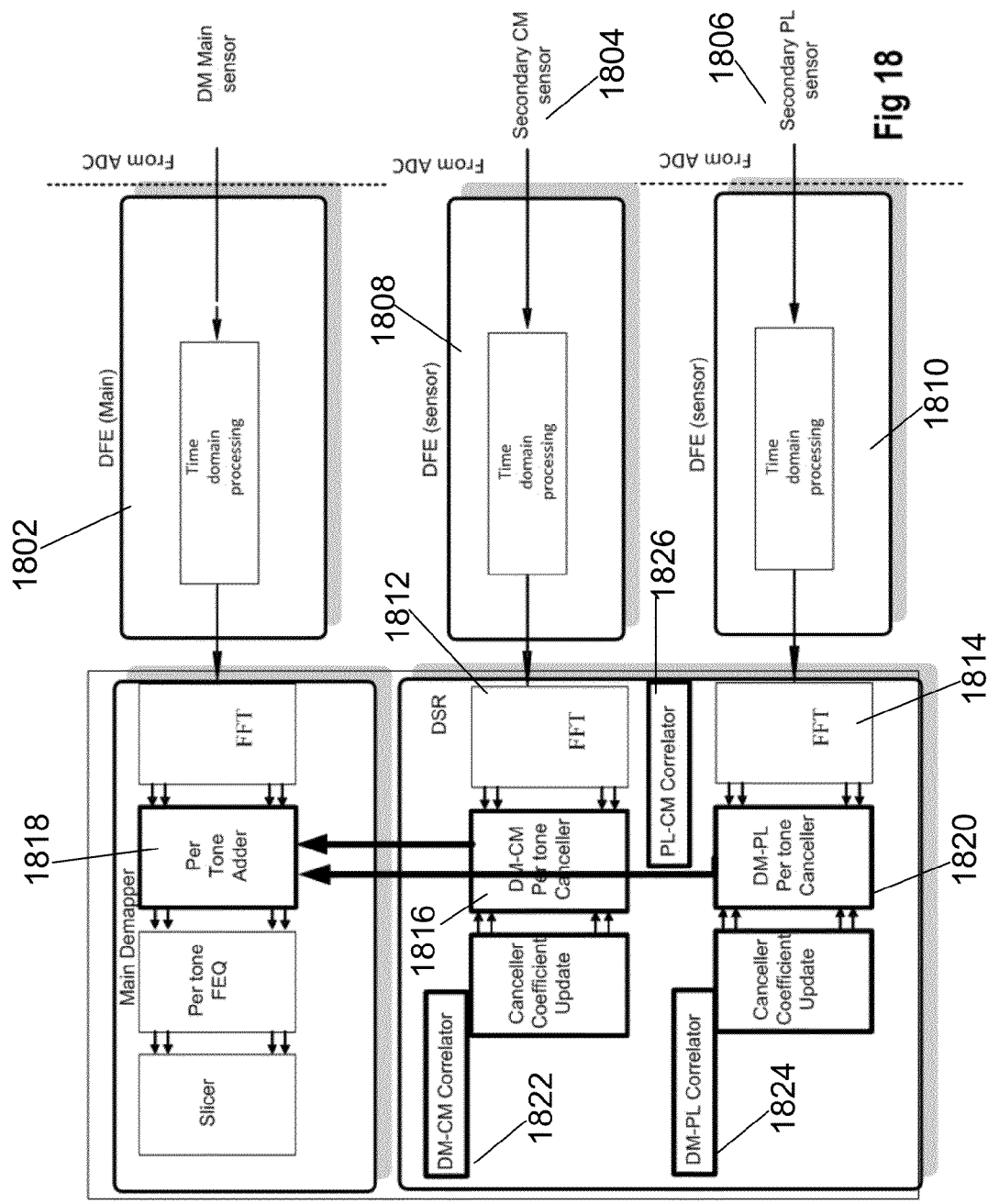
FIG. 18 is a block diagram illustrating an example multiple sensor receiver for performing correlation and cancellation according to embodiments of the invention.

FIG. 18 represents an example embodiment of the invention in which a DM receiver 1802 is coupled with two secondary sensors, one CM sensor 1804 and one Power Line Sensor 1806. Samples from sensors 1804, 1806 are converted from analog and processed by a time domain digital processing block 1808, 1810 and then converted to the frequency domain through an FFT operator 1812, 1814. The frequency domain samples of the CM sensor 1804 are filtered by a DM-CM Per Tone canceller 1816 and added to the DM samples in the DM demapper by means of a per Tone Adder 1818, before being equalized by an FEQ and presented to a slicer block. Similarly, the frequency domain samples of the PL sensor are filtered by a DM-PL Per Tone canceller 1820 and added to the DM samples in the DM demapper by means of the per Tone Adder 1818. The per Tone Adder 1818 block takes input from one or both of the sensors simultaneously. Additional implementation aspects of the components in FIG. 18 that can be adapted for use in the present invention are described in more detail in co-pending application Ser. No. 14/058,112, the contents of which are incorporated by reference herein in their entirety.

One variation of the frequency domain combination is to maintain two or more sets of secondary weights corresponding to the DM-CM Per Tone canceller 1816 and DM-PL Per Tone canceller 1820 and to perform a trial two dimensional slicing operation with the slicer (with or without Trellis Coded Modulation) using each of the trial weight vectors and corresponding CM and PL input signals in order to then retain the trial result with the "best" SNR. This trial can be done on a per tone basis or, with a subset of the bins (e.g. small subset or large subset). This variation provides some improvement of the multi-path degeneracy problem (i.e. two or more aggressors/interferers with different coupling paths into the primary sensor and secondary sensor(s) channels).

Another variation is to exploit a time domain "feature" (aka "signature") to select one of the possible secondary weight sets on a per DMT frame basis to address a situation where multiple aggressors/interferers interfere with the primary channel overlapping in frequency, but not overlapping in time. Another variation is to exploit a frequency domain feature/signature to select one of the possible "secondary weight sets" on a per DMT frame basis.

Another purpose of the embodiment presented on FIG. 18 is to enable characterization of a noise environment within a house. The sensing of signals on the DM port, the CM port and the PL port enables determination of the relative PSD levels of the noise on each sensor, as described above in connection with FIG. 17a, together with determination of a cross correlation level between sensor ports (using blocks 1822, 1824 and 1826 in FIG. 18). While the PSD levels give an indication of the level of noise on the respective media Twisted Pair and powerline network within a house, the correlation levels between sensor ports and the associated canceller coefficients translate the level of coupling between the propagation modes between the twisted pair medium and the powerline medium, or on a same medium. For example, a high level of correlation between the CM and DM port of the twisted pair is associated with a high level of imbalance of the twisted pair, which converts more easily CM signals into DM noise. Similarly, a high level of correlation between the PL sensor and the CM sensor of the twisted pair is indicative of a strong coupling between the power line and the twisted pair, which may result from an unusual close proximity of the powerline network to the twisted pair in the house. Both signal levels and correlation levels can therefore be used to characterize the noise environment in the house. Also, a comparison of the correlation coefficients helps determine the possibility of multiple coupling paths and the level of degeneracy of the coupling of the Power line noise into the DM sensor. The information derived from the comparison of signal levels and correlation coefficients helps identify the relative location of disturbers with respect to where sensors sense their respective signals, as well as identify the multiplicity of disturbers, whenever degeneracy is observed. For example, the relative power of signals, such as two HPAV transmitters S1 and S2, sensed by a power line sensor such as that shown in FIG. 11, helps identify which of the two transmitters is closest. The degeneracy observed by comparing the correlation coefficients computed when either one of them is active helps determine the number of possible transmitters on the power line networks.

Finally, the concurrent processing of DM, PL and CM sensors enables the determination that some DM noises are not coupled from Power Line sources whenever they are visible on the CM and DM sensors and not on the PL sensor. This situation may arise when coupling of noise takes place outside of the house, such as the case for RFI coupling into the drop cable of the twisted pair in CM and DM mode. In this scenario, the same RFI noise may not be visible on the Power Line sensor.

Finally, the addition of a powerline sensor enables the classification and identification of home appliances at the source as they may impact the DSL band of interest. In a house environment, sources of disturbances include house appliances, such as vacuum cleaners, lamps, or equipment, such as pool pumps, washing machines, that affect the DSL WAN interface depending on their characteristics, such as whether they are narrowband or wideband, impulsive or continuous in nature, permanent or intermittent in time. Using a power line sensor, classes of equipments are derived based on the signals characteristics (bandwidth, amplitude, duration, etc.) of the noise disturbance that they produce on the power line sensor. In a subsequent step, their impact on the DM DSL port is evaluated by means of the derivation of the correlation metrics and associated canceller coefficients, which represent the degree by which powerline noise are projected onto the DM sensor. Access to those signal signatures via the power line sensor enable better detection of their signatures and of the presence of those noise in the DM DSL port, thereby providing a better tool to identify individually and track the various noise sources that make up an aggregate noise environment affecting a DSL channel and which originate from the power line network.

Figure 19:
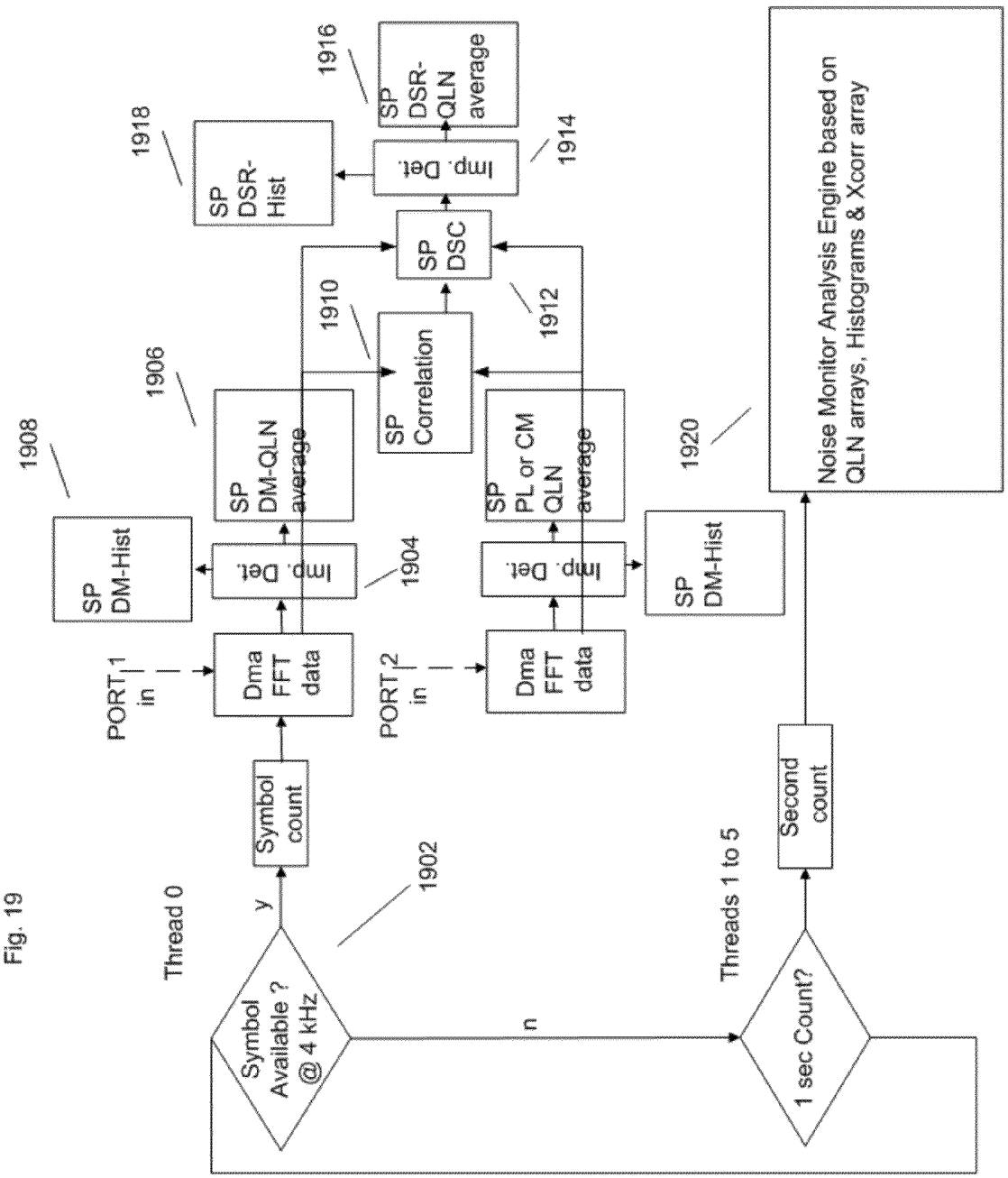
FIG. 19 is a block diagram illustrating an example noise monitor and noise finder module using the multiple sensor signals of the present invention.

FIG. 19 illustrates an example process according to embodiments of the invention by which signals are detected on the secondary PL sensor and correlated to the DM sensor in order to determine the presence of the projection of PL noise into the DM port. This embodiment can be considered a variation of the method and apparatus for effectively detecting and characterizing noise and other events affecting a communications system such as DSL, as detailed in co-pending application Ser. No. 14/054,552, the contents of which are incorporated herein by reference in their entirety. According to certain aspects, the co-pending application describes a noise analysis engine that is embedded in customer premises equipment that classifies noise sources according to their specific characteristics and tracks each noise source in a dynamic manner, in such a way as to provide visibility to the changing noise environment within the customer premises and/or report this environment to a remote entity. Embodiments of the present invention expand the aspects of the co-pending application to operate with the use of an additional sensor for the purpose of characterizing the noise environment with better accuracy.

FIG. 19 is a block diagram illustrating an example architecture for implementing a Noise finder session on the CPE according to embodiments of the invention. It illustrates the State Machine and processes associated with the Noise Analysis Engine and in particular how the data collection thread has been implemented to accommodate the use of multiport sensors such as those described in the present invention. The various elements of this architecture are described in more detail as follows.

Symbol based State Machine 1902. The data collection process operates on a symbol based state machine triggered by the availability of FFT output data for two ports, one embodying the DM receiver and a second one embodying the Power Line sensor or a CM sensor port. A symbol counter will enable processing of sync symbol and one second event.

Impulse detector 1904: The impulse detection is performed on each symbol based on time domain or frequency domain information for each sensor port to help determine the presence of an impulse noise source on each of the two ports.

Quiet Line Noise (QLN) metric 1906: A QLN measurement consists of a per tone average of the power of the noise of each port over the 1 second window to provide primitives to the Line Noise analysis engine. The average is done conditionally on an impulse detector flag or flags. Three PSDs are generated ((a) without impulse—b) with impulse—c) with impulse only) in order to determine in the analysis engine 1920 the distinction between impulsive noise of long duration and short continuous noises on any of the two ports.

INM histograms 1908: INM histograms can be populated using the impulse detector flag as input. If several detector flags are available (e.g. per band, per subband), as many corresponding histograms or alternative time primitives array are populated over the one second window.

Correlation block 1910: Correlation Signal Processing (SP) is performed in block 1910, between each of the two sensors input, which provides a per tone array such as one presented on FIG. 16*a*.

Dual Sensor Canceler (DSC) 1912: a Dual Sensor Canceler block takes the output of the two sensors in order to predict and cancel the correlated noise from the Power Line or Common Mode sensor into the DM receiver. The output of the DSC block is followed by an impulse detector block 1914 and a QLN average block 1916 that uses the processed output to detect impulses for histogram population in block 1918 and QLN primitives that are fed to the Noise Monitor Analysis Engine 1920.

Figure 20:
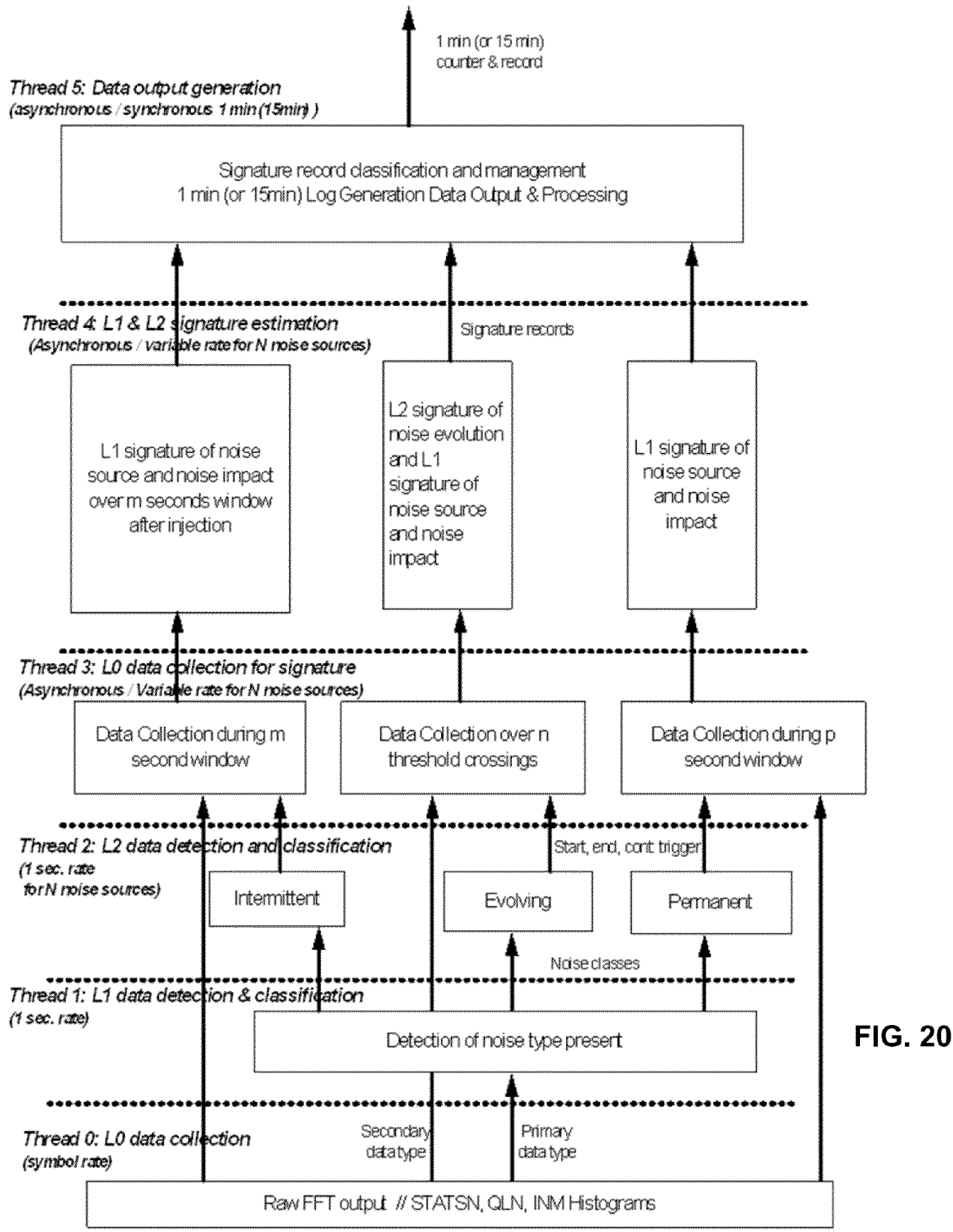
FIG. 20 is a flowchart illustrating an example noise analysis process for use in the module illustrated in FIG. 19 according to embodiments of the invention.

An example process for implementing Noise Monitor Analysis Engine 1920 according to embodiments of the invention is illustrated in FIG. 20.

As shown, processing for a Noise Monitor Analysis Engine 1920 according to embodiments of the present invention extend the principles of the co-pending application by taking input information from additional sensors, which can be either or both of a CM sensor or a PL sensor. An objective of the Noise Monitor Analysis Engine 1920 includes enumerating, after identification and classification, the various types of noises present on the DSL line. Three or more sets of primitives are input to this Noise Monitor analysis process; they correspond to the primitives associated with the impulse histograms 1908 and QLN averages 1906 for each of the DM, PL, CM ports as well as the primitives associated with the impulse histograms 1918 and QLN averages 1916 for each of the DM-CM, DM-PL canceller 1914 outputs. Details of the processing performed in Threads 0, 1, 2, 3, 4 and 5 shown in FIG. 20 are described in the co-pending application, and those skilled in the art will be able to understand how to adapt this processing for use with the multiple sensors of the present invention after being taught by the present disclosure.

The process of noise detection, classification, signature estimation and logging depicted on FIG. 20 is done with primitives associated with each sensor and/or the output of cancellers. The process allows the determination of the presence of specific classes of noise on each of the sensor as described in the co-pending application. It also allows determining to what degree a noise presence on one of the sensor is present on the other sensors, thereby allowing a determination of the coupling mechanisms between the modes of propagation of the signals on the mediums (twisted pair, powerline) to which those sensors are connected.

The process of noise detection, classification, signature estimation and logging depicted on FIG. 20 is done on primitives that are generated while the modem is not used for data transmission, such as illustrated in FIG. 19. Alternatively, this process can takes place on primitives generated on each of the sensor output, whenever the modem is used for DSL data transmission. These modes correspond respectively to the Noise Finder and Noise Monitor diagnostic modes described in the co-pending application.

Although the invention has been particularly described herein in connection with a particularly useful application to DSL communications over conventional telephone lines, the invention is not limited to this application. Rather, the principles of the invention can be extended to various types of wireline transmission systems such as coaxial cable systems, including, for example, Multi-Media over COAX (aka MoCA), HPNA (including HPNA 3.1 over COAX), and ITU-T G.hn (including twisted pair, base-band coax and RF coax). For these communication systems, the addition of a power line sensor help characterize or mitigate the ingress of power line noises which find their way onto the coaxial cable medium, in a similar fashion as they find their way on a twisted pair within the home.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed:

1. An apparatus in a customer premises environment of a wireline communication system, comprising: a primary sensor coupled to receive data signals of the wireline communication system; and a power line sensor coupled to receive power line signals corresponding to noise source interferences originating from power mains in the customer premises environment, wherein the power line sensor is used with the primary sensor to characterize the noise source interferences in conjunction with another secondary sensor.

2. The apparatus of claim 1, wherein the wireline communication system is a Digital Subscriber Line (DSL) system.

3. The apparatus of claim 1, wherein the wireline communication system is a Coaxial Wireline system, the Coaxial Wireline system being Multi-Media over Coaxial Cable (COAX), Home Phoneline Networking Alliance (HPNA) based network, and ITU Telecommunication home network standard (ITU-T G.hn) based network.

4. The apparatus of claim 1, further comprising a power supply unit, wherein the power line signals are derived from the power supply unit.

5. The apparatus of claim 1, wherein the power line sensor includes an external probe that couples to the power mains.

6. The apparatus of claim 1, wherein the another secondary sensory includes one or more of a common mode sensor, a phantom mode sensor and a differential sensor not coupled to receive the data signals.

7. The apparatus of claim 1, wherein a cancellation process is performed using a combination output of the individual sensors, as a linearly weighted sum.

8. The apparatus of claim 1, wherein the power line signals are derived from a combination of one or more of Hot and Neutral wires, Neutral and Ground wires and Hot and Ground wires of the power mains.

9. The apparatus of claim 1, wherein the power line signals comprise one or more of a Differential Mode signal between Hot and Neutral wires and a common mode signal between Hot and Neutral and Ground wires of the power mains.

10. The apparatus of claim 1, further comprising a canceller adapted to cancel noise affecting the data signals using the power line signals.

11. The apparatus of claim 10, wherein the canceller includes a digital signal processor that performs adaptive linear filtering on the data signals and power line signals.

12. The apparatus of claim 10, wherein the wireline communication system is a multitone system and wherein the canceller operates on a per tone basis in the frequency domain.

13. The apparatus of claim 10, wherein canceller operates to complement another cancellation process that is performed using a third sensor.

14. The apparatus of claim 13, further comprising a selector for conditionally selecting the output of one of the cancellers.

15. The apparatus of claim 1, wherein the power line sensor is used in conjunction with other sensors to characterize noise in the customer premises environment and sources thereof, and their impact on the wireline communication system.

16. The apparatus of claim 15, in which characterization is performed using at least the primary sensor, the powerline sensor and a secondary common mode sensor.

17. The apparatus of claim 15, in which characterization includes determining the coupling between at least two of the primary sensor, the powerline sensor and a secondary common mode sensor.

18. The apparatus of claim 15, wherein the characterization is performed by estimating noise sources power on the sensors and noise correlation across the sensors.

19. The apparatus of claim 18, wherein a determination of number and relative location of the noise sources is based on the characterization.

20. An apparatus in a customer premises environment of a wireline communication system, comprising: primary sensor coupled to receive data signals of the wireline communication system; a secondary sensor that is not coupled to receive the data signals and is coupled to receive a secondary signal corresponding to noise impacting the data signals, wherein the secondary sensor is a power line sensor coupled to receive power line signals corresponding to noise source interferences originating from power mains in the customer premises environment, and wherein the power line sensor is used with the primary sensor to characterize the noise source interferences in conjunction with another secondary sensor; and an embedded noise analysis engine that collects information regarding the received signals from the sensors and which performs classification of the noise based on the information.

21. The apparatus of claim 20, wherein the embedded noise analysis engine collects information regarding the noise while transmissions to and from the apparatus using the wireline communication system are not in service.

22. The apparatus of claim 20, wherein the embedded noise analysis engine collects information regarding the noise while transmissions to and from the apparatus using the wireline communication system are in service.

* * * * *